United States Patent [19]

Carpenter

[11] 4,456,277
[45] Jun. 26, 1984

[54] TRICYCLE

[75] Inventor: Alan E. Carpenter, Lyons, Colo.

[73] Assignee: Cyclodynamics of Colorado, Inc., Boulder, Colo.

[21] Appl. No.: 397,024

[22] Filed: Jul. 12, 1982

[51] Int. Cl.³ .................... B62K 23/06; B62M 1/06
[52] U.S. Cl. ......................... 280/282; 180/205;
   180/215; 272/73; 280/202; 280/269; 280/283;
   280/289 A; 280/289 S
[58] Field of Search ............. 280/282, 281 LP, 267,
   280/269, 202, 283, 289 R, 289 A, 289 S, 289 D,
   289 E; 180/205, 215, 210, 216, 217; 272/73;
   310/75 B, 75 C, 75 R

[56] References Cited

U.S. PATENT DOCUMENTS

| | | | |
|---|---|---|---|
| 3,827,519 | 8/1974 | Snider | 280/282 |
| 3,843,145 | 10/1974 | Templeton | 280/282 |
| 3,910,126 | 10/1975 | Felder | 280/289 |
| 3,913,929 | 10/1975 | Matsuura | 280/282 |
| 3,940,166 | 2/1976 | Smithea | 280/290 |
| 4,061,460 | 12/1977 | George | 272/73 |
| 4,198,072 | 4/1980 | Hopkins | 280/281 LP |
| 4,303,256 | 12/1981 | Mortensen | 280/281 LP |
| 4,325,448 | 4/1982 | Pivar | 280/282 |
| 4,333,664 | 6/1982 | Turner et al. | 280/281 LP |
| 4,360,224 | 11/1982 | Sato et al. | 280/282 |

Primary Examiner—David M. Mitchell
Assistant Examiner—Donn McGiehan
Attorney, Agent, or Firm—Jacques M. Dulin

[57] ABSTRACT

Human-powered, front-wheel drive tricycle of a 2DS-1IS (2 driven, steerable-1 independent suspension) format having two steerable front wheels in a fully engineered front end, a multi-triangulated space frame and a single trailing rear wheel mounted in an independent swing-arm type suspension. A chain drive system (21+speeds) includes a crank assembly mounted on a prow ahead of the front wheels driving a transfer gear and differential to the split front axle. A transfer gear caliper/disc braking system ahead of the differential provides braking force equally distributed to both front wheels regardless of road conditions, resulting in anti-skid properties. Track/wheelbase ratios above 0.45 provide stability and excellent handling; FWD provides excellent traction. Preferably, all wheels are of the same 20" diameter. Rider is in a semi-recumbent, supine position with handlebars, having shift and braking controls, mounted beneath a rigid seat. Shoulder harness and seat belt system are provided. Faired, semi-faired and unfaired models disclosed, with full fairing including an open-top cockpit, NACA inlets and safety lighting system, capable of speeds in the 40-60 mile-per-hour range. Crank motor assist, rear wheel motor drive, and PTO for Third World usage shown.

71 Claims, 19 Drawing Figures

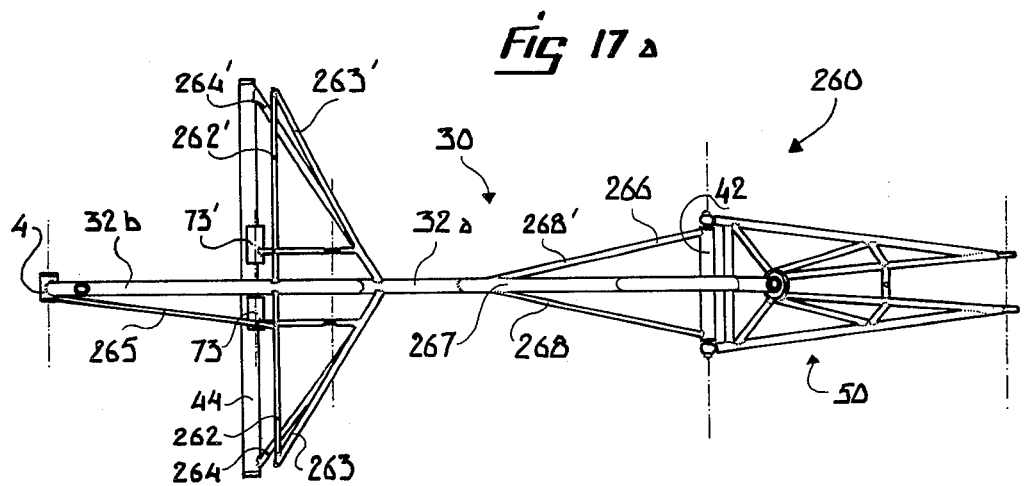
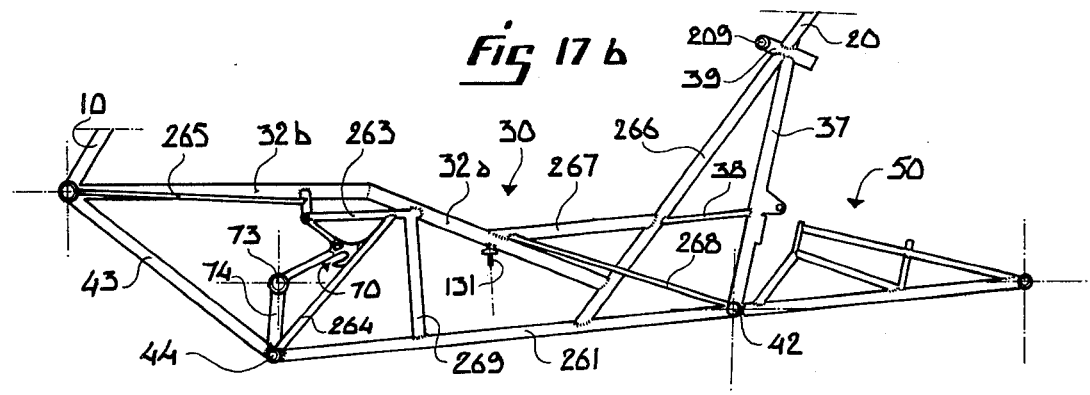
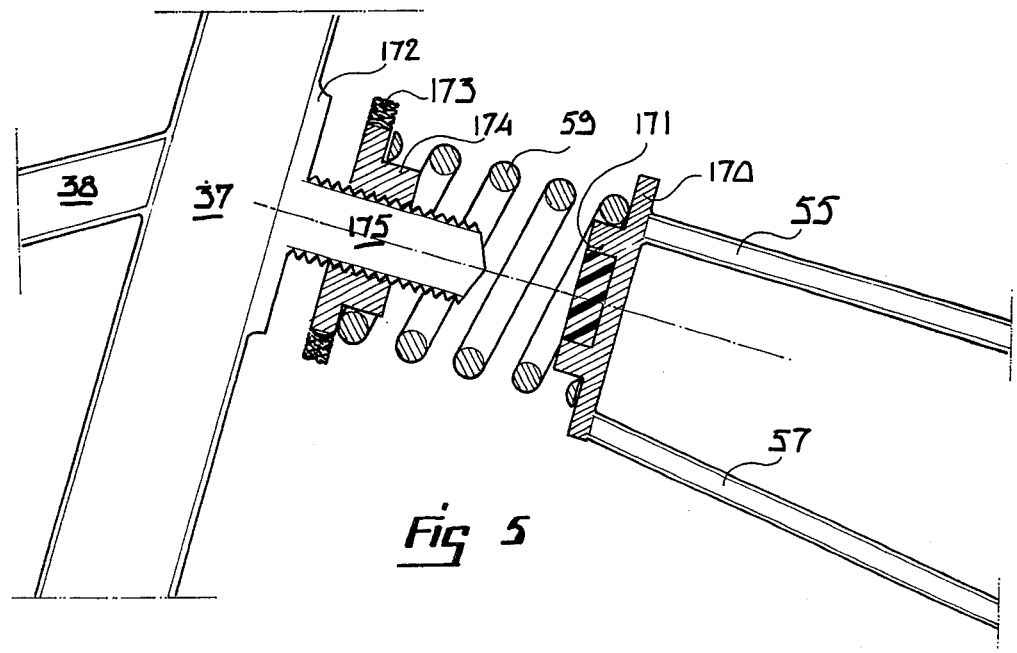

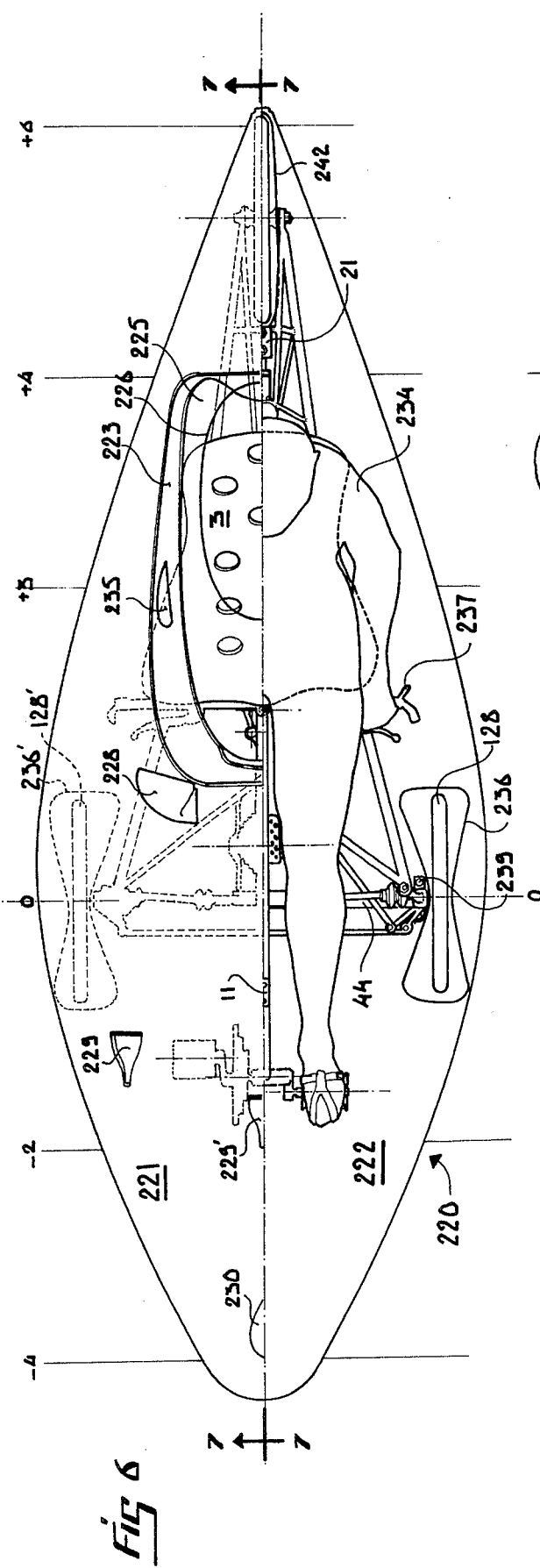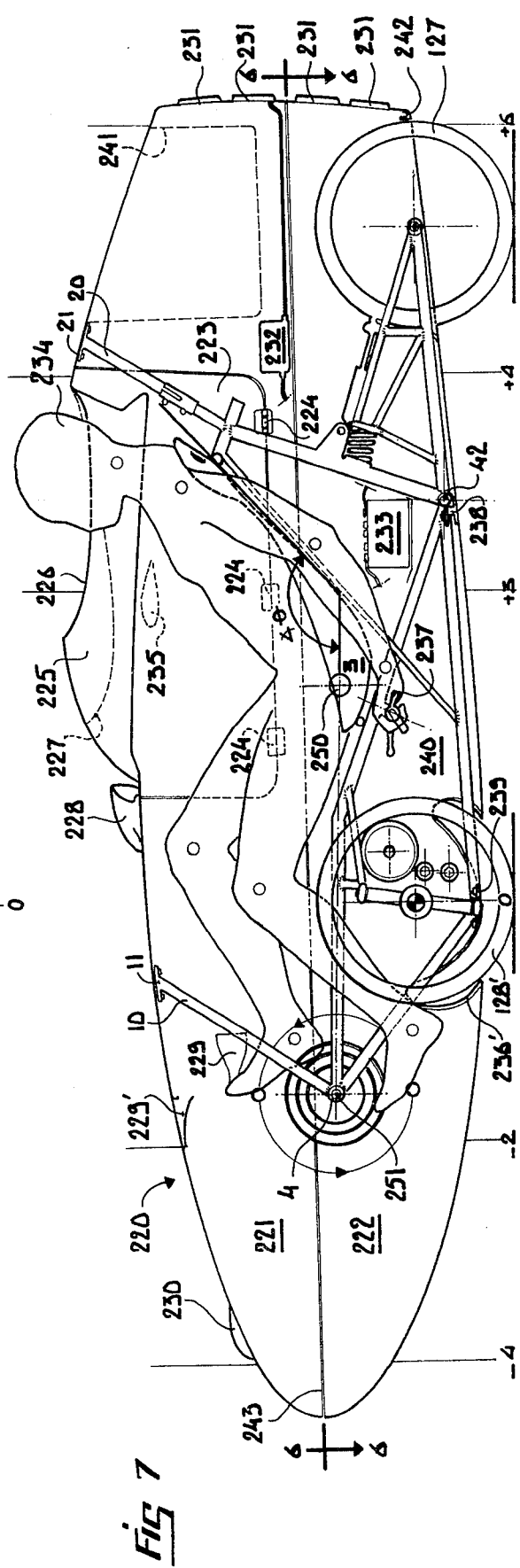

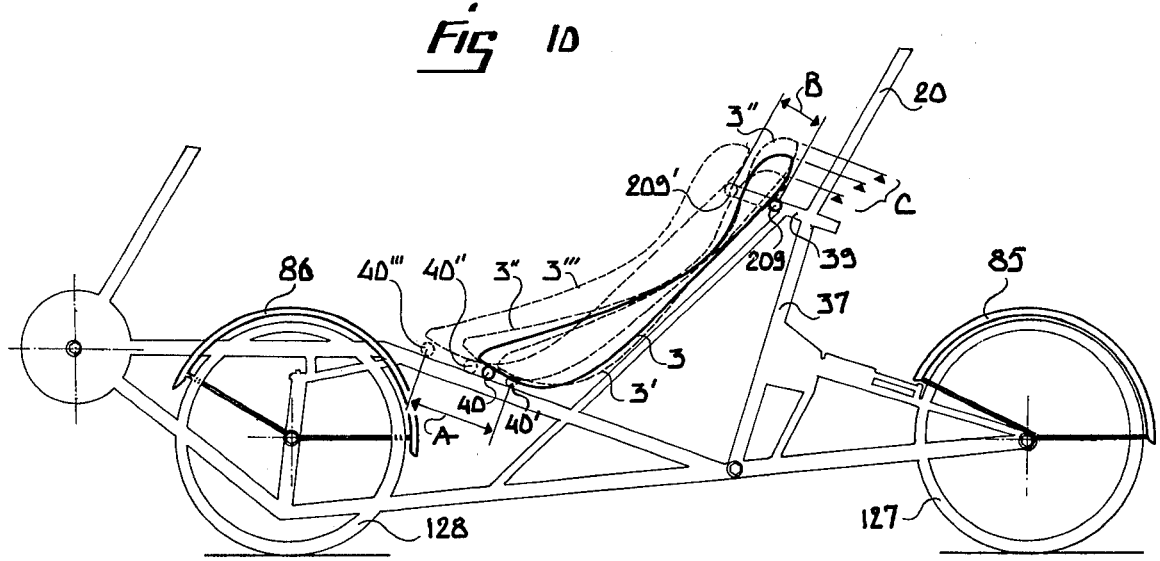
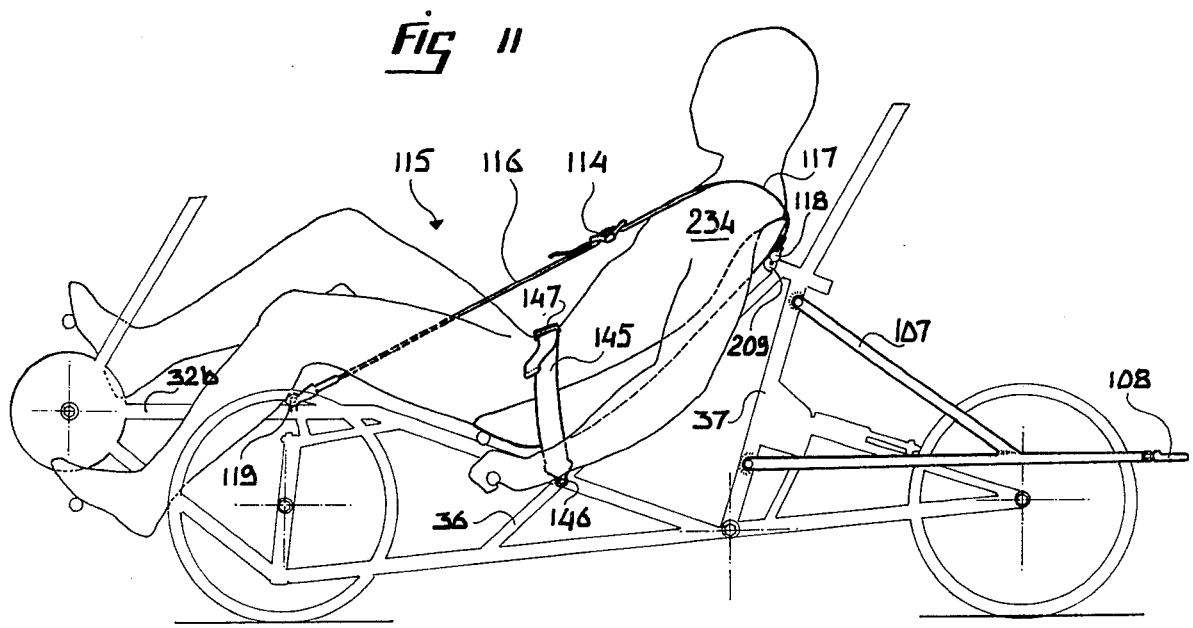

TRICYCLE

BACKGROUND OF THE INVENTION

1. Field of the Invention

This invention relates to three-wheeled vehicles, and more particularly to improved, high-efficiency, front-wheel drive tricycles of a "2-1" (1 front-2 rear) configuration with an independent rear suspension having a transfer gear/disc braking system and a fully engineered front end that is particularly suitable for human-powered operation with the driver in the recumbent, supine position. In a most preferred embodiment, the improved tricycle of this invention is fully faired. Alternatively, the vehicle is adaptable to be used with a small displacement engine providing mileage on the order of several hundred miles per gallon. In still other embodiments, a partially faired or unfaired vehicle is particularly suitable for Third World transportation, light haulage, industrial and agricultural usage.

2. General Background

Cycles, particularly bicycles, have been the subject of continuous engineering development from the days of the two-wheeled push bike in 1816 by Baron von Drais in Karlsruhe, Germany, with his "lauf maschine" (also known as the Draisine machine) to the first pedal-operated bike by Scotsman Kirkpatrick MacMillan in 1839, Pierre Lallement's "boneshaker", a crank bicycle of the 1860's, to today's high-tech racing bikes. The mechanical system of the bicycle, that is, the pedal, crank and chain transfer system to the rear wheel gears has been estimated to be 92–95% efficient in transferring energy from the human operator to the rear wheel. However, at speeds of 25 miles an hour and above, 90% of the effort goes into overcoming wind resistance. This is due in principal part to the upright position of the rider.

Tricycles have enjoyed much less popularity for the principal reasons that they are heavier by the addition of a third wheel, and their width offers even greater wind resistance. Nor do they have the advantages of good handling characteristics evidenced by bicycles in which the rider can maneuver easily with the front fork steering and the ability of the rider to lean into turns.

There have been some traditional usages of tricycles, most commonly in the West as children's play vehicles. Rear wheel drive three-wheeled pedicabs or bicycle-powered rickshaws are in extensive use in other areas of the world, particularly the Orient. Typically, such pedicabs consist of the front half of a bicycle including the single front wheel and fork mount with the rider in the upright position, with two trailing wheels between which are mounted seats for passengers or platforms or racks for light haulage. These are "1-2" (1 front 2 rear) configurations.

More recently, with the advent of high technical interest in breaking speed records for human-powered vehicles (HPVs), there has been a renewed interest in faired tricycles. This has come about at least in part by the need to reduce the cross-sectional area to reduce wind resistance. Accordingly, the rider position has been changed to a recumbent or semi-recumbent position, either prone or supine. Although there have been several bicycles through the years with recumbent positions, most recently the HYPERCYCLE, the EASY RACER, and the AVATAR 2000, these bicycles have proven to be difficult to ride because because it is more difficult to balance the bicycle in the recumbent position, particularly the supine position. Those three recent bicycles are reminiscent of the 1934 era GRUBB recumbent bicycle and the Ravat CYCLORATIO patented in England in 1936 by Albert Raymond.

Because of the balance problem of recumbent cycles, a tricycle of "2-1" format has been used for speed challenge HPVs, including the current world speed record holding Vector tricycle. The Vectors are steerable only about 10°–15° from a straight line as the speed is determined over a 200-yard, straight-line course.

3. Description of the Prior Art

In the relevant tricycle art, in addition to the well-known child's tricycles and the pedicab or bicycle-powered rickshaw, all of which are single wheel in the front with two rear wheels ("1-2" types), there are a number of more recent developments. Both the child's tricycle and the pedicab/bike-drawn rickshaw employ front-fork, single-wheel steering. The pedicabs and rickshaws are rear-wheel driven, while the child's tricycle is front-wheel driven by does not employ a gear system. The CONKLING recumbent tricycle employed a single rear wheel with rear-wheel drive. The front steering employed a pair of standard bicycle head tubes and front forks joined together with a transverse bar or tube. The frame was hung from the crossbar between the front pair of standard bicycle head tubes and fork arrangement, *Ecomotion*, No. 4, 10/81, pages 5 and 6.

The proposed GILMORE pedal car (as shown in *Ecomotion* 3/80, page 3) calls for the rider being in the prone position with the tricycle having dual front-wheel drive with rear steering.

The recently developed VECTOR, as shown in the Sept. 1981 *American Wheelman*, is a fully faired tricycle having two large wheels in the front and one in the rear (2-1 type). The front track is very narrow, and the vehicle has a steering displacement of only about 15° each side of centerline. The rider is in a recumbent supine position with the bottom bracket being well above the rider's hip joint. The steering is by means of a tiller. The vehicle has a very large 100-tooth front gear, and the chain extends back to a rear-wheel drive gear cluster providing 6 speeds. There is braking only at the rear wheel. This is a race vehicle only, is not intended for street use, and comes in a single-rider vehicle and a tandem in which the two riders are back to back. Drag coefficient is said to be 0.11, and drag is reported to be reduced on the order of 75%. The VECTOR holds the world records for a single-rider, 200-meter sprint at 58.64 miles per hour, and 62.92 miles per hour for a tandem, both achieved at the International Human Powered Vehicle Association (IHPVA) championships held in California in 1980.

More recently, in an effort to develop more practical road vehicles, the IHPVA began holding road races which tested stability, endurance and cornering in addition to raw, straight-line speed. As reported in the September 1981 *American Wheelman*, page 4:

"According to Paul Van Valkenburgh, a race car engineer and designer, 'the practical possibility for any of the HPV's we saw racing is really slim except on a bike path. If you haven't ridden them, you don't know how vulnerable you feel. Your visibility is bad. Your conspicuity is bad, and the protection is minimal. Even Al Voigt, who builds the Vectors, is reluctant to make demonstration runs for his vehicle on the street, even when he's got an escort, because you've got half the visibility of a bicycle.

'On a bicycle you're invisible. If you've got half the area, especially half the height, you're really invisible.'"

The same article "How About One for the Road?" on page 3 of the September 1981 *American Wheelman* states:

"Paul B. MacCready, IHPVA timekeeper and well-known as the designer of human-powered and solar-powered airplanes states, 'The Vector and similar vehicles are beautifully engineered for the purpose of winning a race. But now there is another goal—making a practical street vehicle. You don't do it by extrapolating from these vehicles. You do it by setting a goal, and building a thing that is going to do that. It may not even look like any of the vehicles here. It may not use bicycle wheels, standard sprockets or chains or whatever.

'You've got to start with the practical goal—inexpensive, safe transportaton at commuting speeds, which I call 35 miles per hour less, not the freeway speeds.'"

Another recent design is the AERO tricycle shown in the September 1981 *American Wheelman*. This is a rear-wheel drive tricycle having two front wheels smaller than the rear wheel. This tricycle employs a T-bar frame with tiller steering in which the wheels track parallel. The drive system is a rod linkage reciprocating system rather than a rotary pedaling of a standard bicycle. There is no rear suspension, and the driver's hip pivot is well above the crank pivot. This tricycle is not good for hill climbing because the rider cannot stand up on the pedals. The MATRIX is another racing 2-1 tricycle with two large front wheels that is apparently rear-wheel drive, fully faired with limited steering capability. The bottom bracket appears to be well above the rider's hip pivot. Similarly, the RED SHIFT also shown in the *American Wheelman*, September 1981, is a three-wheel vehicle of a 2-1 type but it is rear-wheel drive. The front wheels track parallel for racing in a straight line, and the pedals and the crank are behind and above the front axle. While this is a recumbent position, the bottom bracket is apparently well above the hip pivot.

A review of tricycles appeared in *Ecomotion*, No. 1, August 1979, in an article on "Tricycles" by Mike Eliasohn. He discussed the various types, including: single front wheel, rear drive (1S-2D); dual front wheels, rear drive (2-1D); and dual front wheels, front drive (2D-1). As to the latter, he states, "Such a design would use rear wheel steering, the same as on Buckminister Fuller's Dymaxion cars of the 1930's" (i.e., 2D-1S). He in turn quotes the editor of the *Ecomotion* Newsletter, Randy Gilmore, as stating about the theoretical advantages of the dual front-wheel, front-drive type of tricycle:

"It is a fact that dual steering wheels can never be made to track correctly and that one or both will be forced to skid sideways a little, especially on sharper turns. In an automobile, this is insignificant, but in a man-powered vehicle, this results in unnecessary extra friction and driving effort."

He also comments that the rear-wheel steering design has the advantage, since it is pulled rather than pushed, of being less tendency to scrub sideways on a sudden or sharp higher-speed turn. Eliasohn continues by commenting:

"Disadvantages of this design, as I see it, are the need for relatively heavy front axle and a differential, and with a supine seating position, to get reasonable traction, the rider would have to straddle the front axle, thus would have to sit higher than with, for instance, a single driving wheel in the rear.

"The one front drive, dual front wheel tricycle that I know of that has been completed was that of then Massachusetts Institute of Technology student Lee Laiterman. It was designed as a pedal-powered lawnmower. Minus the mowing attachment, Laiterman told me in a telephone conversation that it worked very well."

As to U.S. patents, U.S. Pat. No. 3,913,929 of Matsuura, which appears to be the basis of a rear-wheel drive tricycle called the "SLINGSHOT" by MASA, which is no longer made, shows a dual front-wheel, rear-wheel drive tricycle. The front wheels are steered in parallel, and the rear wheel is larger than the front wheels. The rider is slung between a pair of side frames, and steering is by means of levers, with one arm bent and the hands at knee level. The driving crank system is between the side frames and behind the front wheels. There are no springs, and the seat sling can be canvas, plastic or metal. Braking is by a friction braking to the wheel rims, a brake drum, or brake discs at the wheels. This is 2S-1D format.

The U.S. Patent to Hopkins U.S. Pat. No. 4,198,072 shows a tricycle having a single-driven front wheel with a crank and bottom bracket on an outrigger ahead of the front wheel. In this tricycle, the two rear wheels are extremely small, being on the order of the size of casters or skateboard-type wheels, which wheels are steerable by handlebars positioned below the seat. The handlebars are directly attached to the wheels, and the pivot is behind the back of the rider. This is a sports type of device for smooth, paved areas. It employs a pivoted fabric or mesh seat, the pivoting of which changes the steering axis. By shifting the steering axis depending on the position of the rider and leaning into the turns, a very exciting recreational ride is claimed. This is 1D-2S format.

The U.S. Pat. No. 4,272,095 of Ptaszek shows a child's tricycle with a single large front wheel on a fork which is direct drive through a crank forming the front-wheel axle. The two rear wheels are castered. The backrest of the seat is pivoted so that the caster angle can change. When the casters are perpendicular to the ground, the casters can whip, and the child does a spin-out. This is 1DS-2T (turnable) format.

A toy auto is shown in the Doak U.S. Pat. No. 2,501,035. This is a tricycle having a sheel in the form of a convertible automobile. The front wheels are directly driven by a crank forming the wheel axle, and the rear wheel is steerable by a rod linkage system. This is 2D-1S format.

The McCormick U.S. Pat. No. 1,196,129 is a hand-powered quadracycle employing two large front wheels which are directly driven by a hand crank forming their axle, and a pair of smaller rear wheels carries a seat. The frame is articulated at approximately the knee position of the driver. Steering is done by warping the baseboard by foot pressure. This is 2DS-2A (articulated) format.

A Need in the Art

As noted above by the quotes of MacCready and Van Valkenburgh, there is a need for making a practical on-road, street-type of vehicle which is capable of being mass produced and overcomes the disadvantages of current straight-line racing vehicles, yet preserves the advantages of stability while permitting greater transfer of energy to the driven wheels.

THE INVENTION

OBJECTS

It is a principal object to provide an improved 2DS-1IS (2 driven steerable-1 independent suspension) type front-wheel drive tricycle having two steerable front wheels, an independent rear suspension, a transfer gear braking system and a fully engineered front end, for street usage.

It is another object of this invention to provide an improved tricycle having a recumbent, supine position for the rider and which is specially adapted for human-powered operation for sport, commuter usage, light haulage, industrial and light agricultural use.

It is another object of this invention to provide an improved, fully engineered tricycle having front-wheel drive and which may be adapted for small displacement engine assist for the basic human power providing mileage on the order of several hundred miles per gallon.

It is another object of this invention to provide an improved front-wheel drive tricycle with the rider in a recumbent, supine position, and which may be fully or partially faired.

It is still another object of this invention to provide an improved human-powered, three-wheel vehicle having front-wheel drive and which may be specially adapted for Third World usage, including provision for power take-off, and racks, platforms, or seats for carrying passengers or light loads.

It is another object of this invention to provide a safety system for recumbent human-powered or motor-assisted, human-powered vehicles including warning, directional and safety lighting systems, and seat belt and shoulder harness systems.

It is still a further object of the invention to provide an improved, streamlined fairing for a human-powered, or small-displacement motor-assisted human-powered vehicle, which reduces the drag and permits relatively high velocities on the order of 40-60 miles per hour for human-powered operation.

It is still another object of the invention to provide improved framework and seating arrangements for tricycles which are lightweight and yet retain high structural strength and stability at high speeds.

It is another object of this invention to provide an improved braking system for a human-powered vehicle.

It is still another object of the invention to provide an improved air inlet and ducting system to provide ventilation in a human-powered, faired vehicle which provides sufficient cooling air flow yet which does not cause excess turbulence thereby substantially reducing improvements in drag coefficient.

Still further and other objects of the invention will be evident from the detailed description.

SUMMARY OF THE INVENTION

The invention comprises an improved, three-wheel, human-powered vehicle (HPV) of a 2DS (Driven, Steerable)-1IS (Independent Suspension) type which may also be adapted for engine or battery-powered assist. The tricycle is both driven and steerable at the front whels by virtue of a fully engineered front end. The trailing (non-steerable) rear wheel is mounted in an independent rear suspension of a swing arm type employing a shock absorber. The rider is in a semi-recumbent, supine position with a fully adjustable seat to compensate for variation in rider body proportions.

A 21-speed drive system is shown employing a transfer gear and differential to provide power to both front wheels. Braking occurs prior to the front differential so that braking force is equally distributed to both front wheels regardless of road conditions resulting in anti-skid properties. This is provided by a unique transfer gear disc-type braking system ahead of the differential. The frame is a triangulated space frame having a prow extending ahead of the front wheels on which is mounted the bottom bracket and crank assembly. The prow length may be varied to accommodate a wide range of rider heights, from under 5 feet to over 6 feet for adults, and shorter for children.

The fully engineered front end includes caster, camber, Ackerman compensation, and kingpin inclination inboard of the tire edge for high-speed turn stability, improved tire wear and tip-resistant safety features. The front wheel drive provides extremely high traction, particularly suitable for Third World applications, especially in agriculture and for light industrial and commuter transport uses. The invention also provides a critical relationship between the wheel size and the ratio of the wheelbase to the track, which results in improved handling and high speed turn stability. The preferred embodiment employee three wheels of the same 20-inch size.

The steering handlebars are beneath the seat in a natural, relaxed position, and steering, braking and gear shifting controls are disposed on the handles. I have also found that the pivot axes of the bottom bracket and the rider's hip are preferably placed on a substantially horizontal line with the rider's back supported in a rigid seat so that the full power can be developed during spinning (rotating the crank with the feet). The invention also provides shoulder straps and seat belt systems, which are part of the seat assembly and critical to high-speed, safe operation.

The tricycle is shown in both unfaired and fully faired versions, for Third World and road touring utility, respectively. The fairing is a light-weight plastic shell, particularly designed for medium speeds in the range of 20-50 miles per hour. It employs specially placed NACA (National Advisory Council for Aeronautics) inlets in combination with an open-top cockpit and a configuration which creates negative cockpit pressure. This sucks air through the inlets providing ventilation comfort for the rider within the shell. The wheels are also fully faired. A lower speed version having partial fairing on the body with faired wheels and faired fenders is disclosed. A safety lighting system is mounted on the fairing shell, including a nose warning light, head and brake lights, turning indicators, and safety strobe flashers.

A wide variety of accessories and alternative embodiments are shown. These include a keel-type of frame as an alternative to the modified-pyramid, multi-triangular space frame of the preferred embodiment; use of an internal combustion engine as a pedal assist or rear wheel drive; use of a battery or solar-charged, battery-assisted drive; racks or platforms for carrying loads; a tow-bar for towing small trailers; power take-off for Third World usage; a cycle and rider monitor to provide information on the physical condition of the rider (pulse, etc.) and the speed of the vehicle; various types of fairings; various frame construction materials, including: bamboo; wood (e.g., spruce); various steel alloys (e.g., chrome-molybdenum steel); titanium; carbon fiber plastic; 10-20-5 DOM mandrel drawn steel; and the like; and various gear systems and gear train arrangements, including standard derailleur systems and cam plate systems.

BRIEF DESCRIPTION OF THE DRAWINGS

The invention is described in more detail by reference to the drawings in which:

FIG. 5 is an enlarged detail view partly in section of the rear suspension adjustment assembly;

FIG. 6 is a plan view of the fairing (body shell) taken along line 6—6 of FIG. 7 with one-half broken away to show the rider's position;

FIG. 7 is a side elevation of the fairing taken along line 7—7 of FIG. 6 showing the rider in the recumbent position;

FIG. 10 is a side elevation of the tricycle partly in schematic showing the various adjustment positions of the seat;

FIG. 11 is a side elevation, partly in schematic, with a silhouette of a rider showing the safety belt and shoulder harness systems, and a tow bar for a trailer;

FIGS. 17a and 17b are respectively a plan view and a side view of a keel frame embodiment for the tricycle of this invention.

DETAILED DESCRIPTION OF THE PREFERRED EMBODIMENT

The following detailed description of the preferred embodiment is with referennce to the various figures and is meant to be illustrative and not limiting of the principles of the invention described and claimed herein.

Figure 1:
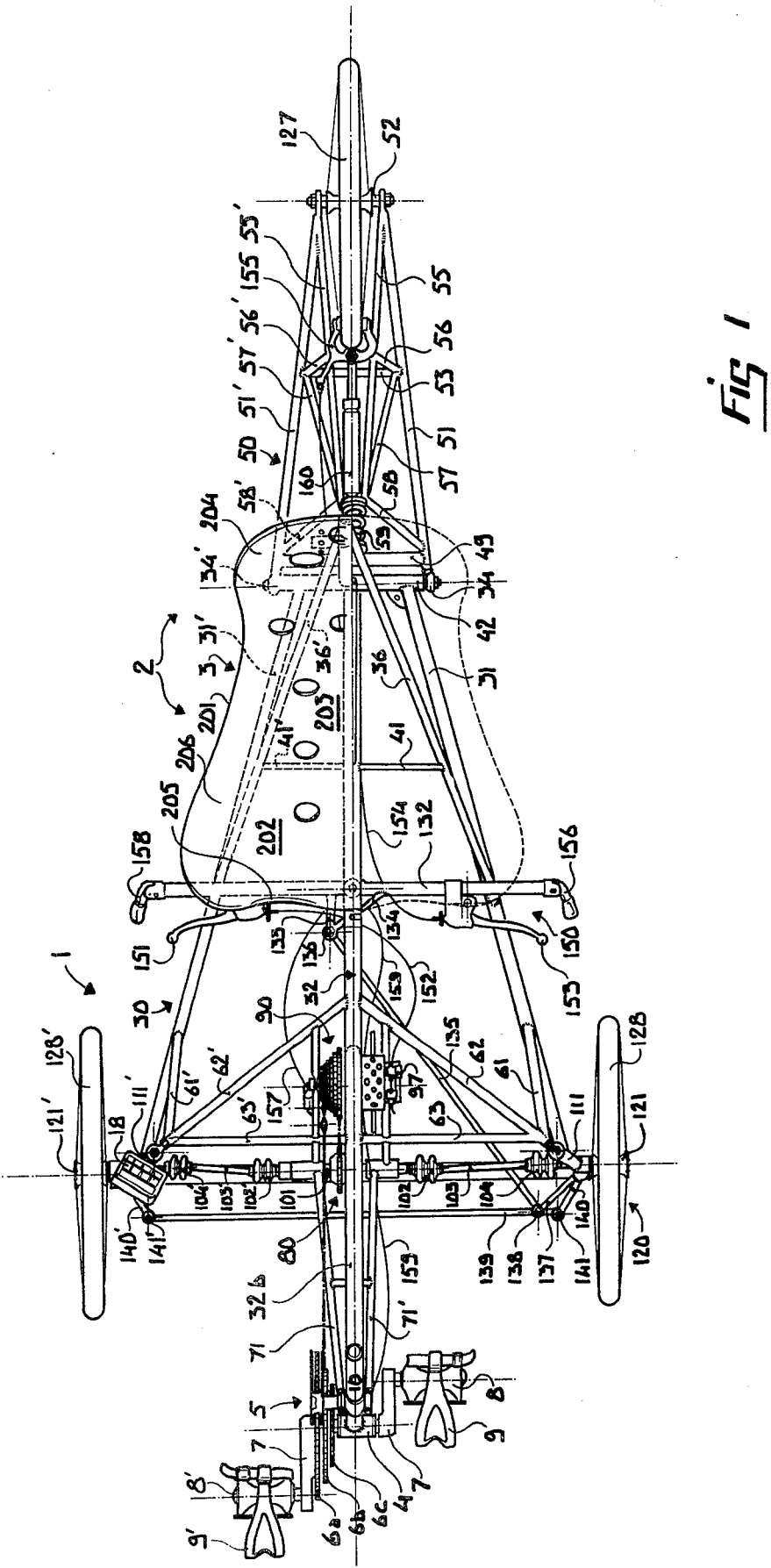
FIG. 1 is a plan view of the tricycle of this invention.
Figure 2:
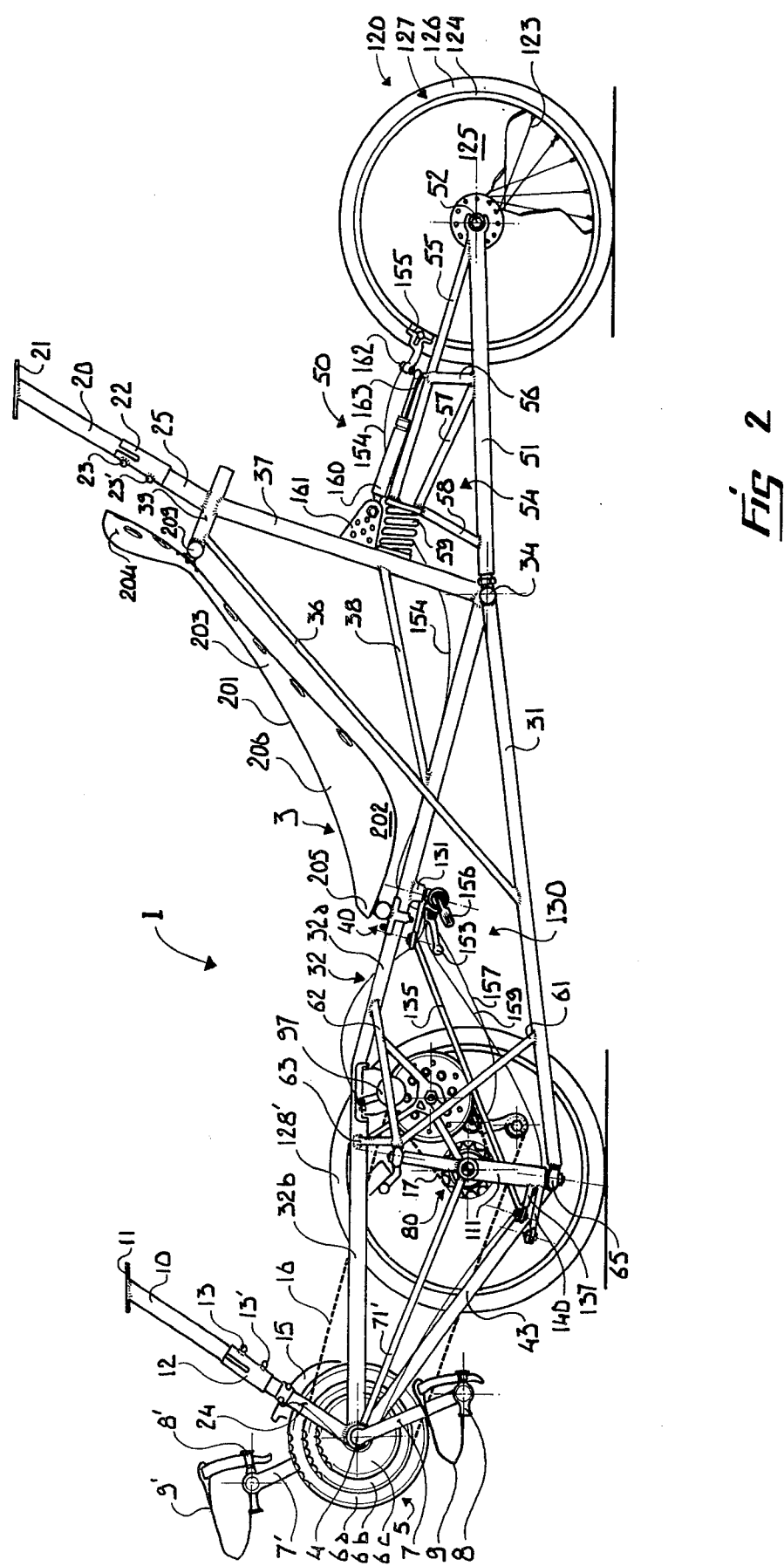
FIG. 2 is a side elevation view of the tricycle.
Figure 3:
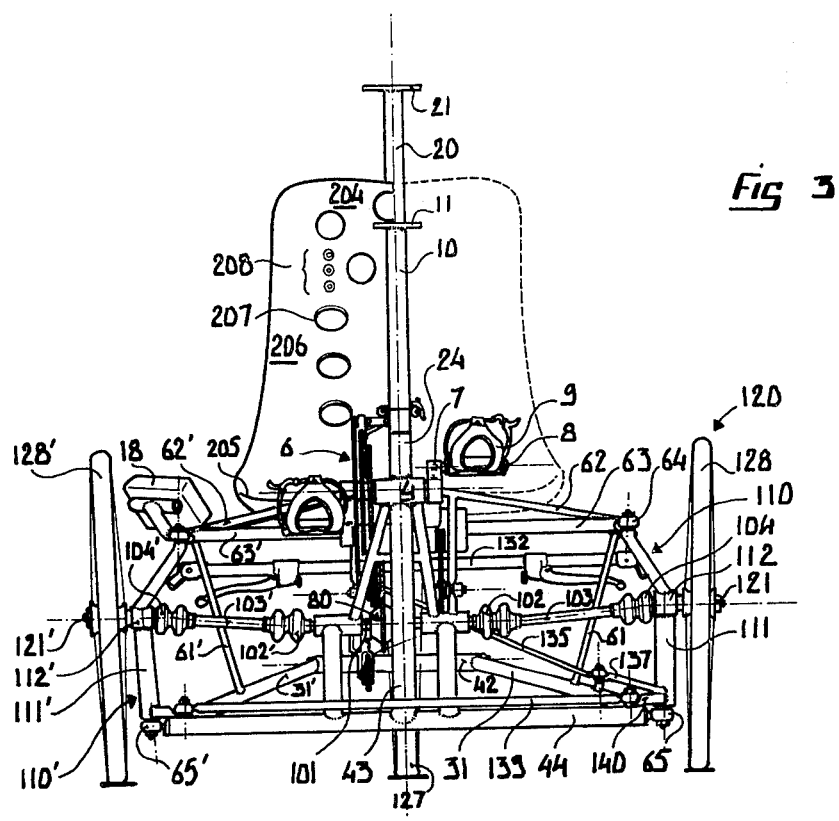
FIG. 3 is a front elevation.

FIGS. 1, 2 and 3 are respectively a plan view, side elevation and front elevation view of the 2-1 type FWD tricycle of this invention. Tricycle 1 comprises a generally modified pyramidal, triangulated space frame assembly 2 which in turn is composed of two major parts, the front main frame assembly 30 and the rear swing arm assembly 50. The rider of this human-powered vehicle is seated in a recumbent, supine position in seat assembly 3 (see FIGS. 7 and 11) with his/her feet placed in the pedals 8, secured by toe clips 9, to operate the crank assembly 5. As seen in more detail in FIGS. 1, 3 and 4, power is transferred to the front wheels (FWD), which front wheels are steerable via a fully engineered front end, i.e., 2D-1IS format.

Before going into detail on the construction of the tricycle, a specific example is discussed next below.

Figure 9:
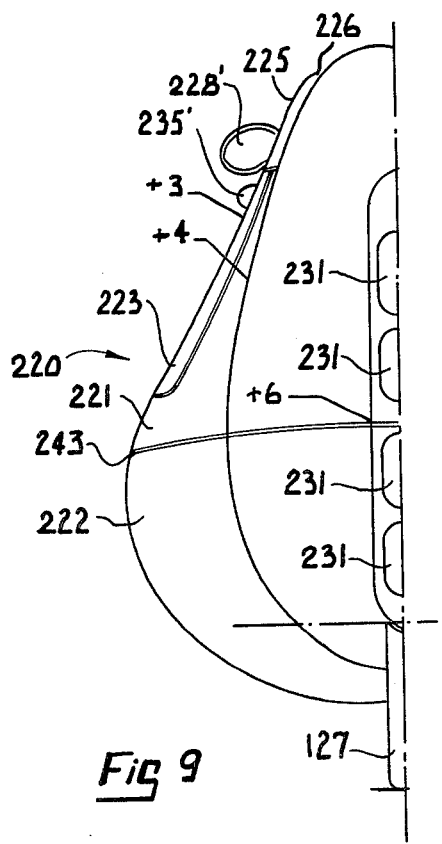
FIG. 9 is a rear silhouette of the left half of the tricycle fairing showing body contour lines along positions +3, +4, and +6 of FIGS. 6 and 7.

A tricycle in accordance with this invention which is fully faired as shown in FIGS. 6–9, and employing the alternative triangulated space frame of the keep type shown in FIGS. 17a and 17b has been extensively tested in Colorado in varying road and weather condition, including rain and snow. The frame was constructed of 1020 alloy DOM steel silver-nickel brazed together. The total weight was on the order of 80 lbs with the fiberglass shell approximately half of that. The overall length of the shell was 9 ft 6 in, with the overall width being 38 in. The front track was 31½ in, and the wheel base 51 in. A 21-speed, wide-ratio gearing was employed with three speeds through the chain rings of 56, 46 and 36 teeth, and the main gear set employed 13, 15, 17, 20, 23, 26 and 28 teeth in each ring, respectively. The differential drive ring was 22 teeth. Front braking was by disc braking in the transfer gear system with a caliper brake on the rear wheel rim. The front wheels were steerable by means of the handlebar below the seat. The rear suspension was mono-spring with a hydraulic shock absorber having about 4½ in of travel. The human operator was in the recumbent, supine position with shoulder and waist belts. The windshield of the fairing was DOT type 48 optically clear windshield plastic material. A rechargeable strobe safety lighting system was provided as best seen in FIGS. 6, 7 and 9. The overall height of the vehicle as best seen in FIG. 7 was 42 in. The rider was helmeted.

On straight-line level course with no tail wind, a reasonably qualified rider (not of Olympic or world class caliber) could achieve 48 miles per hour. Top speed achieved with wind assist was in excess of 60 miles per hour. 30–40+ miles per hour were very comfortable for several hours. In one test run, the vehicle was human powered up a one in four grade, rising some thousand feet over Boulder, Colo. The 2½ mile grade was comprised of washboard gravel and chuck holes. The test rider took 45 minutes to climb this in the human-powered vehicle. All of this test work was by single rider, and the vehicle was not assisted by any engine motive power. None of the wheels were faired in these test examples. All three wheels were of the same size, being 20 in wheels with hook bead tires. A monitoring system 18 (FIGS. 1 and 3), was used to monitor the heart rate, cadence, speed, distance, and the like.

As compared to the racing tricycles, such as the Vector, the HPT of this invention has extremely good handling characteristics. This is due in part to the fuly engineered front end and the track-to-wheelbase ratio being on the order of 0.6. We have found that a track to wheelbase ratio below about 0.45 is relatively unstable. In addition, the braking prior to the front differential, wherein braking is equally distributed to both front wheels regardless of road conditions, provides anti-skid characteristics.

I have also found it critical to have a substantially rigid seat, one with sufficient flex in the back for comfort, but rigid so that the rider's hips are braced against the lower back portion of the seat. I term my seating position to be semi-recumbent and maintain the pivot axis passing through the hip joints of the rider substantially horizontal with respect to the bottom bracket crank (spindle) axis. This may be varied approximately ±2 in above or below horizontal. Also, the included angle between a line passing through the bottom bracket axis and the rider's hip axis and the sloping back of the seat should be approximately 130° ±20°. In a normal bicycle, with the rider in the upright position, the rider can only work with his own weight plus some small amount of upward tension on the handlebars. In contrast, a bicyclist in good shape using the semi-recumbent position of this invention can provide approximately 900 lbs of force which may be on the order of over four times the weight of the rider himself. (It is to be understood that reference to a rider means either a male or a female rider. In the tests above, the rider was male.)

I have also found that the shoulder strips are essential as they prevent the rider from sliding upward, thus losing touch with the pedals and being less able to provide adequate power during spinning. I have found that in the HPT (Human Powered Tricycle) of this invention, most riders can spin comfortably at 75-80 rpm, with greater exertion being on the order of 90-100 rpm. Due to the semi-recumbent position, the rider is relaxed from the waist upward, and the hands are likewise relaxed. In the usual upright bicycling position, the rider is hunched over with a substantial portion of this weight on the handlebars. The forearms and palms of the hand get extremely tired after hours of riding. In marked contrast, in the HPT of this invention, the rider's hands rest naturally in a relaxed position below the seat on the handlebars. I may employ an optional waist belt, but should not be tied into the shoulder straps.

The position of the bottom bracket is spaced sufficiently far forward so that the rider has more leg extension than in a regular bicycle. If the bottom bracket is too close to the seat, the rider's vastus medialis muscles will tighten up. On the other hand, the bottom bracket should not be so far forward that the knee is locked out. In the preferred position, the ankle should be about 65% of full point extension. Thus, the combination of the rigid seat, shoulder harness, semi-recumbent position, and the relationships, both as to distance and position with respect to the horizontal, of the bottom bracket rotational axis and the hip pivot axis, all critically combine to give the unexpectedly improved results in the human-powered tricycle (HPT) of this invention.

The test riders have been able to ride the HPV tricycle of this invention for hours over varying road conditions, including up and down hills at over 30 miles per hour without becoming exhausted. Accordingly, the tricycle of this invention is eminently suitable not only for touring, but also as a commuter vehicle if desired. By means of lighter weight structural materials, the weight of the vehicle with fairing can be reduced to approximately 30–40 lbs. Thus this vehicle can be used as a racing vehicle for road-type races, not merely 200-yard, straight-line sprints. In addition, the vehicle track is sufficiently wide that two riders can be positioned side-by-side. By virtue of the swing-arm type independent rear suspension with shock absorbing characteristics, the ride in the vehicle is extremely smooth. By virtue of the front wheel drive, the vehicle is capable of going through at least 4 in. snow, and over washboard gravel road conditions. I also believe the 20 in. wheel size is optimum for the design of this tricycle HPV as it gives less rolling resistance. There is less rotating mass therefore reducing the moment of inertia. They also have less dynamic throwout and exert less gyroscopic force. Further they have less spoke mass, and accordingly less fan effect and less flex. This combines for better handling characteristics. This size is contrary to the teachings of the art. However, wheels may be larger or smaller or of mixed sizes.

The fully engineered front end employs 1° to 2½° of caster with 1½° being preferred, and approximately 1° of camber. I prefer to employ approximately 5% Ackerman compensation for high-speed turn stability with 1¼° kingpin inclination. For human-powered operation, the toe-in for the vehicle is preferred to be 0. For the motor pedal assist, the front wheels should toe out, whereas for the motor rear-wheel drive, the vehicle should have toe-in. An additional safety feature is the use of the hook-bead rim type of tires.

For dual working (pedaling) riders, the second position may either be side-by-side, or one behind the other with the second positioned over the rear wheel, in a tandem position and may alternatively be back-to-back, with an additional prow and crank assembly to the front-wheel drive through a transfer gear.

Supporting the front-wheel spindles only on one side, contrary to the teachings in the art of employing front forks, is best for this design. I prefer to employ two frame lengths, one for riders shorter than 5 ft. 10 in., and a frame which is approximately 4 in. longer in the prow assembly for riders taller than 5 ft. 10 in. on up to approximately 6 ft. 6 in. The frame may be constructed of a variety of materials, including wood, bamboo, fiber-wound plastic, carbon-filter plastic, titanium, chrome-molybdenum alloy, and other sophisticated materials. However, I prefer to use a 10-20-5 DOM mandrel-drawn steel tubing. The steel tubing may be nickel-silver brazed together for excellent strength. Where an inherently flexible material is used for the frame, such as bamboo or wood, the rear independent suspension may be eliminated as the frame will flex vertically along its length. The total weight, including the fiberglass shell, is in the order of 70–80 lbs. with the machine weighing approximately 40 lbs. and the shell on the order of 30 lbs. A preferred shell material is a polyester-impregnated polyester fabric shell. I can employ off-the-shelf cycle parts for the construction of the tricycle of this invention. Accordingly, its construction is relatively straightforward to one skilled in the art. In the preferred embodiment, fenders and full-wheel fairings are employed.

Another important aspect of the HPT of this invention is its health advantages. The rider gets a complete aerobic work-out with heart-rate, cadence, speed, distance etc. being recorded by monitor 18, yet the ride is extremely comfortable and fun even at relatively high speeds. The 21-speed, wide-ratio gearing permits hill climbing at a reasonable cadence, yet the vehicle is under complete steerable control contrary to bicycles. Additonal gearing can be implemented on the HPV tricycle of this invention, among others by changing the differential gear ratio, or by adding additional differential gears and a derailleur system therefor. Different gear ratios may be used depending on the usage. For high-speed trials, larger chain rings may be employed, whereas for Third World, industrial, commuter or light industrial use, lower gear ratios may be employed.

Returning then to FIGS. 1–3, the main frame assembly 30 comprises a modified pyramid formed by the lower mains 31, 31', the top tube 32 which forms the backbone, the kingpins 111 and 111', the kingpin transverse connector 44, the upper kingpin main supports 62, 62', and the horizontal triangulation strut 63, 63'. The base of the pyramid is formed by the lower mains 31, 31', and the kingpin transverse connector 44. The back of the pyramid is formed by the transverse swingarm mount tube 42 from which the rear swing arm assembly 50 is pivoted. The pyramid sides are formed by the seat tube 32a, the kingpins 111, 111', the upper kingpin mains 62, 62', and the horizontal triangulation strut 63, 63'.

The crank assembly 5 is mounted on a prow comprising the bottom bracket tube 32b and the downtube 43 which may also be termed a bottom bracket diagonal support. The prow, containing the bottom bracket 4, is supported from lateral and torsional forces by bottom brackets struts 71, 71'. The crank assembly 5 comprises chain rings 6a, 6b and 6c, a pair of cranks 7, 7', each of which carries a pedal 8, 8' and optional toe clips 9, 9'. The chain rings are for example respectively 56, 46 and 36 toothed rings.

Extending upwardly from the bottom bracket 4 is an optional front upper body mount 10. Where the HPV tricycle of this invention is employed in an unfaired condition, this body mount tube may be eliminated. Likewise, where the fairing is only over the basic modified pyramidal, triangulated space frame 2 or the main frame assembly 30, this tube may be eliminated. For the faired embodiment, as shown particularly in FIGS. 6, 7, 8 and 9, body mount 10 supports the forward portion of the fairing as described in more detail below. This body mount includes a plate 11 to which the upper half of the firing is mounted at the front, a split ring type takedown sleeve 12, and fastening bolts 13, 13'.

Figure 4:
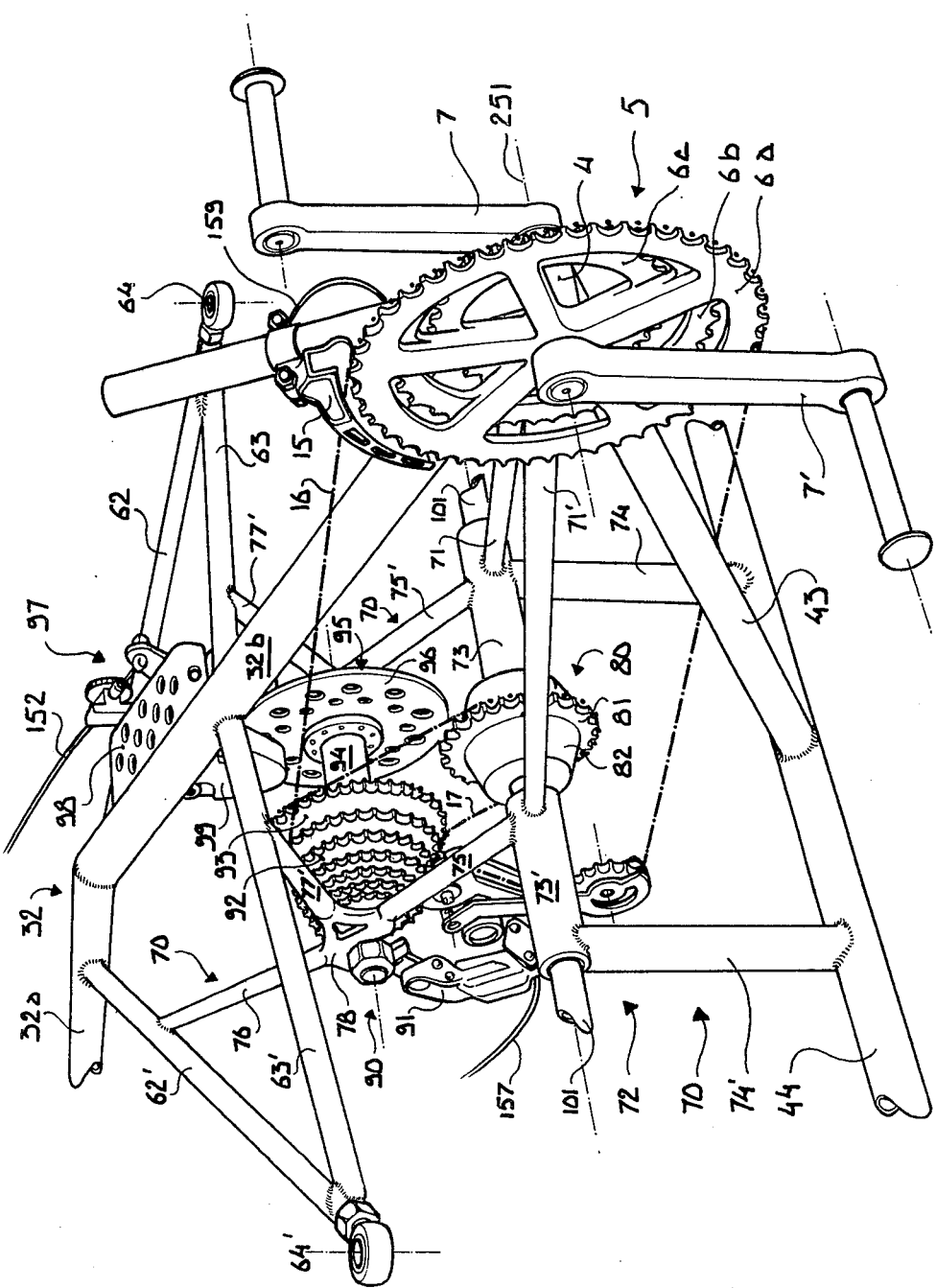
FIG. 4 is a three-quarter perspective of the gear drive train.

The appropriate chain ring is selected by the chain ring derailleur 15, the controls for which are on the handlebar as best described below in more detail. The energy from pedaling is transferred to the main drive assembly 90 as best seen in FIG. 4, and in turn to the differential assembly 80 by transfer chain 17.

It should be noted that in FIG. 2 the front left wheel has been removed in order to not obscure the details being described at this juncture. Likewise, in FIG. 3 the pedal position is somewhat different than in FIGS. 1 and 2 in order to not obscure certain details of the frame assembly. Likewise, not all of the element numbers are shown on all of the figures because they would obscure certain of the details of those assemblies. However, by comparing the three figures all elements will clearly be seen.

As best seen in FIGS. 2 and 7, the rear portion of the upper half of the body is supported by rear body mount tube 20. The upper half of the shell is secured in place by screwing it to plate 21. The tube 20 is secured by means of take-down sleeve 22 which is tightened in appropriate position by bolts 23, 23'. Both the front and rear upper body mount tubes 10 and 11 can be slide from their respective frame support tubes 24, 25 by loosening the respective bolts from the split ring sleeves.

The seat assembly 3 is supported by the following structures. Rear seat main 37 is canted backwardly off the center of the transverse swing arm mount tube 42 and is torsionally stabilized by seat triangulation stays 36, 36'. Likewise, flex in rear seat main 37 (by virtue of the force transmitted through the swing arm spring as described below in more detail) is prevented by stabilizer 38 which extends from a position opposite the swing arm spring to the seat tube 32a. Likewise, transverse stabilizers 41, 41' tie in the diagonal seat triangulation stays 36, 36' to the seat tube 32a.

In a similar manner, front diagonal triangulation stays 61, 61' help support the frame and maintain the proper kingpin inclination.

The upper portion of the seat assembly mounts into telescopic upper seat tube 39, and the front of the seat is mounted to sliding lower seat mount assembly 40. The seat assembly 3 comprises a seat shell 201 having a flared buttock area 202, a back area 203 having a recurved lumbar support, and a flared shoulder rest area 204. The seat also has a front lip 205 which prevents the rider from sliding too far forward as it catches in the buttock crease, and has side lips 206 which provide side support in turns. Vent holes 207 provide cooling for the back and shoulders. There are a plurality of adjustment holes 208 which assist in the seat adjustments to carefully fit the rider as described in more detail below in connection with FIG. 10. The upper back portion of the seat is secured to the upper seat mount cross-piece 209 by bolts passing through the selected ones of the holes 208.

Looking particularly at FIG. 2, the rear swing arm assembly 50 comprises a pair of lower mains 51, 51' extending from swing arm pivots 34, 34' to the rear wheel axle 52. Transverse tubes 49 and 53 (see FIG. 1) placed forward of the rear wheel keep the lower swing arm mains properly spaced. The spring tower assembly 54 includes a pair of upper mains 55, 55' extending between a dropout plate of the rear axle 52 and the spring 59. These upper swing arm mains are torsionally braced to the lower by triangulation stays 56, 56'. Also shown are a set of spring braces 57, 57' and 58, 58'. The shock absorber 160 is mounted between the upper spring arm main transverse tube 163 and the shock bracket mount 161 which in turn is mounted on the back of the seat main 37. A rear caliper brake 155 is mounted on a brake bolt 162 which in turn is mounted on the upper swing arm mains transverse rod 163.

The wheel assembly 120 includes a rear axle 52 for the rear wheel and stub axles 121, 121' for the front wheels. The wheels 120 may be standard 20 in bicycle wheels having spokes 123 mounted to hook bead rim 124 to which tire 126 is mounted. The wheels may be fully faired by having fairing covers 125 mounted thereon as shown for example at rear wheel 127. Likewise, the front wheels 128, 128' may be also faired.

The steering assembly 130 (see FIG. 2) comprises a handlebar pivot 131 secured to the underside of the seat tube 32a just rearwardly of the front lip of the seat 205. This position may vary somewhat depending on the precise position of the seat as it is adjustable for various sized riders, but is positioned to be comfortable for the particular rider whose hands must be on the handlebar 132 to control the shift and brake control assemblies 150 thereon. As best seen in FIG. 1, drag link pivot arm 133 which is supported diagonally by stay 134 contains pivot 136 in which the drag link 135 is pivoted at 138 to the kingpin steering pivot arm 137 which is fastened to the kingpin 111. The transverse track rod 139 is pivoted between the pair of track rod pivot arms 140, 140' (which are secured to the kingpins 111, 111') by pivots 141, 141'.

The shift and brake control assembly (see FIG. 1) comprises front brake lever assembly 151 on the right-hand side which operates the front disc brake 97 via front brake cable 152. Rear brake lever assembly 153 operates the rear caliper brake 155 via the rear brake cable 154. The handlebar end shifter 156 for the main drive assembly 90 is on the left end of the handlebar and connects to the main drive assembly by shifter cable 157. The handle bar end shifter assembly 158 controlling the crank derailleur 15 is on the right end of the handlebar and is connected thereto by the front shifter cable 159.

Looking particularly at FIGS. 1 and 3, the differential assembly 80 drives the main drive axle 101 which is linked to the stub axles 121, 121' of the front wheels 128, 128' via inner universals 102, 102', intermediate shafts 103, 103', and outer universals 104, 104'.

Turning now to FIG. 4, this figure illustrates in a ¾ front perspective a portion of the gear drive train for transfer of power to the main drive axle. The bottom bracket 4 which retains the crank assembly 5 is mounted on the prow formed by the converging bottom bracket tube 32b and downtube 43. As noted above, these tubes are stabilized by bottom bracket struts 71, 71'. For clarity, the pedals and toe clips the cranks 7 and 7'are not shown. Drive chain 16 extends from one of the chain rings 6a, 6b or 6c, depending on which ring it is engaged to by means of the front derailleur 15 which is activated by its control cable 159. The chain engages the main drive assembly 90, which in this example consists of a 7-gear, freewheel cluster 92 which is screwed onto transfer hub 94. The main gear derailleur assembly 91 which is activated by the cable 157 is used to select the appropriate main drive gear depending on road conditions and cadence being maintained by the rider. A transfer gear 93, which in this preferred embodiment is a 32-tooth gear, transfers power via transfer chain 17 to the differential assembly 80.

Differential assembly 80 comprises a differential drive ring (in this particular example having 22 teeth) in a housing 82 with a cluster of planetary gears therewithin (not shown) to drive the main drive axle 101. As will be appreciated, fewer or more gears can be added to the crank assembly 5 and the main drive assembly 90, and different size or additional gears may be added to the differential assembly 80 or the transfer gear 93, to achieve any desired range and spacing of gearing. Where additional gears are added to the transfer gear or the differential assembly, an appropriate derailleur system would be used. Alternatively, a continuously variable ratio drive transfer, for example of the belt and cone type, may be used to achieve transfer of power from the transfer gear to the differential assembly. Likewise, a cam plate system may be used in place of the multiple chain ring/derailleur system of the crank assembly 5.

Drive support assembly 70 is positioned between the kingpin transverse connector 44 and the upper front kingpin main 62, 62' and the horizontal triangulation supports 63, 63'. The figure also illustrates the upper swivel 64, 64' for the kingpins which are positioned between the lower main ball joint 65, 65' mounted on the ends of the kingpin transverse connector 44 and the upper joint 64, 64' (see FIG. 3). The main drive shaft 102 and differential assembly 80 is supported by differential support turret assembly 72 which comprises a pair of bearing tubes 73, 73' containing roller bearings (not shown), which tubes are mounted on upright turret tubes 74, 74' secured to the kingpin transverse connector 44.

The drive assembly itself is mounted in a drop-out plate 78 which is secured in position at the intersection of lower drive gear torsional control bars 75, 75', upper drive gear torsional control bars 76, 76' (bar 76' not being visible in FIG. 4), and transverse drive gear torsional control bars 77, 77'.

The front disc brake assembly 95 comprises a disc rotor 96 rigidly mounted on the transfer hub 94. The brake caliper assembly 97 comprises a caliper mount plate 98 welded to the side of bottom bracket tube 32b, and its caliper assembly 99 is activated by the front brake cable 152.

By the assembly shown in FIG. 4, it can be seen that the invention employs a unique transfer gear hub braking system in which braking of the front wheels occurs prior to the front differential so that braking force is equally distributed to both front wheels regardless of road conditions. This leads to excellent handling and safety characteristics in that it is an anti-skid system.

Further, by viewing FIGS. 1-4, the aspects of the fully engineered front end are evident. The stub axles 121 and 121' are carried in hubs 112, 112' (see FIG. 3) which are mounted as part of the kingpin and wheel-bearing carrier assembly 110, 110'. As noted particularly in FIGS. 2 and 3, this invention employs caster, camber and Ackerman compensation. The kingpin angle is inboard of the tire edge for improved tire wear and non-tip features. The toe-in for the human power operation is held at 0, but would either be toed-out or toed-in as described above for engine assist. Note also particularly in FIGS. 3 and 4 that the bearing tubes 73, 73' as mounted on their turret 74, 74' are not symmetrical with respect to the centerline to allow for the fact that the chain rings 6 of the crank assembly 5 are to the right side of the bottom bracket. Likewise, the intermediate shafts 103, 103' are not of equal length to compensate for the off-center nature. Nevertheless, with the linkages shown and described herein, the handling characteristics of this vehicle are excellent, even at high speeds above 40 miles per hour.

Another aspect of this invention is a fully faired body shell assembly for a human or motor-powered tricycle which is illustrated in FIGS. 6–9. The fully faired body shell assembly 220 comprises an upper half shell 221 and a lower half shell 222. An entry/exit hatch 223 is provided in the upper half shell 221 which hatch has hinges 224 along a lower edge to permit opening for ease of entry and exit. The upper portion of the hatch has a wind screen 225 which is an optically clear windshield which has an upper lip 226. The lip configuration may be varied, and shown in phantom at 227 is an alternate lip configuration which provides for a more open cockpit. The windscreen provides deflection of the air over the head and shoulders of the rider. The cockpit is generally preferred to be open at the top, to satisfy a psychological sense of contact with the environment of the rider. Generally, the rider wears a safety helmet which also assists in streamlining characteristics in combination with the windscreen. If desired, a completely enclosed bubble windshield may be used with appropriate ventilation and sun screen. I provide a plurality of NACA submerged air inlets 229, 229', and 229''. These do not disturb the air flow over the body and provide air inlet. In addition, the open top of the windshield provides an air suction effect which provides excellent ventilation on the interior so the rider does not get overheated on hot days. A pair of faired rear view mirrors 228, 228' are provided on the upper portion of the body shell spaced to give the rider excellent rear view vision without obscuring the forward vision. A fixed or pop-up type headlight 230 may be provided in the front for night visibility. Although shown as a single headlight, it should be appreciated that a pair of headlights may be used. A pair of turn indicator lights 235, 235' are positioned medially along the upper half shell of the fully faired body so they are visible both from front and rear at the same time, and likewise visible to the rider so that their operation may be observed and monitored by rider 234. As best seen in FIGS. 7 and 9, there may be a plurality of tail lights 231, which in this specific embodiment is a vertical array. These are powered by battery 233 connected with a microprocessor switching system 232, and controlled by the rider 234 by switching assembly 237. This permits the rider to indicate turn direction, braking and hazard conditions. In the alternative, the lights can be powered by a generator run from one or more of the wheels, preferably the rear wheel. I also prefer to have the lights in a sequenced array, with one or more of them being a bright strobe for safety. An additional bright strobe may be used in the front for forward warning visibility in both day and night riding.

As best shown in FIG. 7, the upper half body shell is supported on the front upper body mount 10 by plate 11 and the rear upper body mount 20 by plate 21. As an option, a headrest (not shown) may be provided which extends forwardly from the rear upper body mount tube 20. The lower half body shell 222 is secured to the vehicle by a pair of rear body mounts 238 adjacent the rear transverse swing arm mount tube 42, and front body mounts 239, 239' adjacent the ends of the kingpin transverse connector 44. The bottom half shell also has a pair of front wheel cut-outs 236, 236' which, from the plane view as shown in FIG. 6, are butterfly-shaped to provide wheel turning clearance. A rear wheel cut-out 242 is also provided.

As seen in FIG. 7, the hip pivot axis 250 is on substantially a horizontal line with the pivot axis 251 of the bottom bracket 4. The hip pivot with respect to the bottom bracket pivot may be slightly above or below, on the order of ±2 in. The included angle $\theta$ between the line passing between the bottom bracket pivot 251 and the hip pivot axis 250, and the back of the seat 3 should be 130°±20°. I have found that this position which is less than a fully recumbent (lying down) position gives far more efficiency in pedaling for long-distance cruising. Accordingly, this position could be used in other than tricycle-type land-powered vehicles; e.g., it may also be used in airborne vehicles, like the Gossamer Albatross, or in water vehicles (pedal boats).

Shown above and below FIGS. 6 and 7 are a series of contour station markers, with the 0 station lying at the front axle. Forward of the front axle are indicated stations −2 and −4 with the latter being the nose, while behind the station is station +3 which is medial to the rider, and station +4 which lies just behind the cockpit, and station +6 which is adjacent the tail behind the rear wheel.

Figure 8:
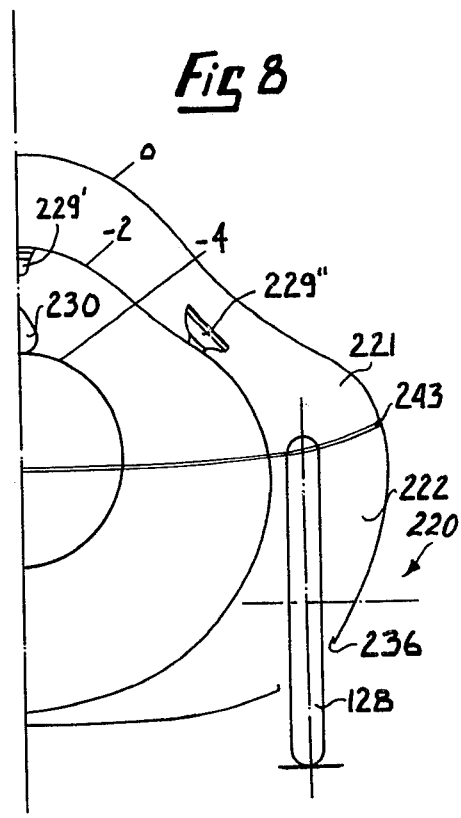
FIG. 8 is the left half of the front silhouette showing the body contour lines along stations positions 0, −2 and −4 of FIGS. 6 and 7.

The contours are shown in FIGS. 8 and 9, with FIG. 8 being the left half of the vehicle as seen from the front, and FIG. 9 being the left half of the vehicle as seen from the rear. Since the body shell fairing assembly is symmetrical along a vertical line passing through the rear wheel, these two drawings are considered to have a common centerline. As can be seen, the lowest clearance of the vehicle is approximately at the 0 station with the tail being raised somewhat. Likewise, the nose is not characterized as being needle sharp, but rather is a gently rounded shape with the widest portion of the vehicle being at the 0 station. In addition, the tail of the vehicle is elevated, but not so high that it is adversely affected by crosswinds. The vehicle is faired both for forward motion and to not be adversely affected by crosswinds; accordingly, it has a concave aspect at the 0 and −2 contour stations in the upper half shell and provides a shoulder adjacent the position of the joining of the two shells along the joint 243. This body fairing is a compromise fairing for the speeds contemplated for the vehicle of this invention. This fairing is appropriate for speeds in the range of from 15 to approximately 80 miles an hour, but is less efficient at speeds above that. It is not a high-speed fairing, but rather the rounded nose moves the air smoothly around the frontal cross-section of the vehicle. In a regulation bicycle, approximately 90% of the effort of the rider goes into overcoming wind resistance at speeds above 25 miles per hour. I have found that with the fairing of this invention as described above, my HPT is twice as efficient considering it is twice as fast as a bicycle (48 mph vs 24 mph). Considering the fourfold greater mass moved at the higher speed, it is 4–8 times more efficient.

Figure 16:
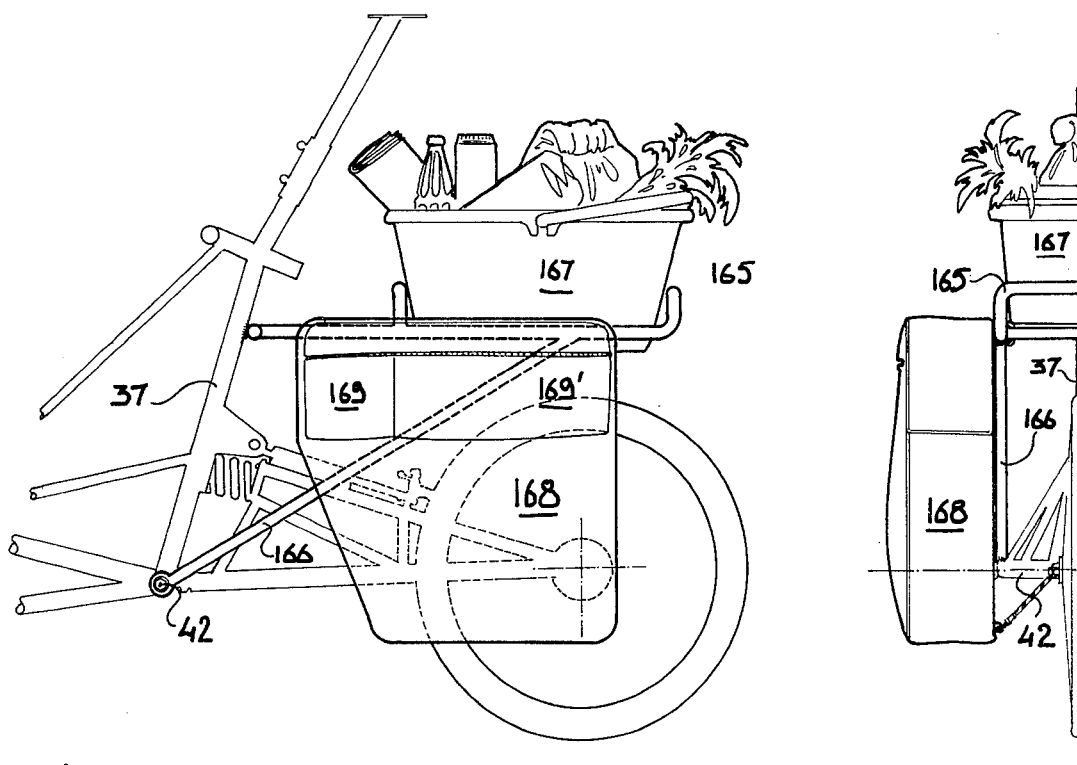
FIGS. 16a and 16b are side and rear elevations of a carrying rack and side bags for carrying various items.

Optionally, a rear hatch 241 may be provided for access to the carrying racks or panniers shown in FIGS. 16a and 16b. In addition, there is adequate space 240 below the driver for carrying small objects such as clothing, books, etc. The wheels 127, 128, and 128' are fully faired, and light-weight fenders shown in FIG. 10 are employed. These fenders may be strips of cloth on a light framework. The body fairing as shown is fiberglass or polyester-impregnated polyester cloth. However, it may be constructed in a monocoque design. In addition, a variety of lighting and reflectors may be used for day and night visibility. For example, a reflector tape may be run along the entire side of the body, or various safety designs using reflector tapes may be employed. As the handlebar brake levers are activated, they will make appropriate contact and illuminate a rear brake light to warn those riding behind that the rider is stopping the vehicle. Various amenities may be provided in addition to the racks and panniers shown in FIG. 16, such as: a baby seat behind the rider; a mapcase or side pockets adjacent the rider on the upper or lower body shell; holders for water bottles, sunglasses, thermos jugs or tape recorders. In addition, two eyes front and rear may be provided to pull the vehicle or assist in moving it. The body shell may be provided in a fully complete form or may be provided in kits. Likewise, the body shell may be only a partial fairing with a wind deflector supported out front of the crank assembly on an outrigger extending from the upper body mount 10 and the downtube 43 plus the frame fairing described above.

For Third World usage, a three-speed Sturmy Archer main drive assembly may be used with $2\frac{1}{8}$ in. tires. I provide 2+ in. higher ground clearance by having the kingpin transverse connector 44 elevated closer to the hubs 112, 112'. Some of the bracing tubes, and the rear spring and shock absorber assembly, may be eliminated to reduce the weight for both Third World and high-speed racing applications.

FIG. 10 illustrates a variety of the seat positioning to accommodate riders of varying sizes. By loosening the securing screws for the lower seat mount assembly 40, and the upper telescoping tube 39, seat 3 can be moved from its original position shown in solid lines backward to the position shown by lower seat mount assembly 40' or forward as shown by positions 40'' or 40'''. Likewise, by securing the upper back portion of the seat to different ones of the holes 208 (see FIG. 3) the seat may be raised or lowered in the positions shown by 3' or 3" as compared to the original position 3. The seat is adjustable approximately 12 in. fore and aft and the height approximately 5 in. to accommodate various sizes of riders. The arrows A, B, and C show the range of adjustments for the seat. The seat adjustments, plus the variations in prow length, permit precise fitting to accommodate various rider sizes.

FIG. 10 also illustrates rear render 85 and front fender 86. For simplicity, the fenders have not been shown in the other figures. FIG. 11 shows the tow-bar assembly 107 which is attached to either side of the seat main tube 37 and terminates in an eye assembly 108 behind the rear wheel for receiving a ball for a standard trailer hitch or a bolt and cotter pin type connector.

In addition, FIG. 11 shows the shoulder harness system 115 which comprises a single central forward strap 116 which is secured with a spring hook to eye 119 on the bottom bracket tube 32b. This forward strap is connected to a pair of shoulder straps which pass across the shoulders of the rider 234 and terminate in hooks which are secured to eyes 118 and 118' on the cross-piece 209. An adjustable connector 114 secures the forward strap and the shoulder straps together. These straps prevent the rider from sliding upward in the seat as he presses with his lower back against the back of the seat during riding, and as such is a performance harness. They have a secondary function of assisting in the event of an accident. In addition, a separate seatbelt 145 is provided which is attached to eyes 146, 146' mounted on the seat stays 36, 36' respectively. A conventional, adjustable, quick-release buckle 147 is provided. This assists the rider in staying in position during turns and in the event of accidents.

FIG. 5 illustrates an adjustable (tunable) spring suspension for the swing arm assembly. The rear spring 59 is mounted on retaining collar 171 secured to spring tower push plate 170. The plate 170 is turn is welded to the upper swing arm mains 55 and the spring braces 57. A threaded bolt 172 is welded to the seat main 37 opposite the stabilizer 38. A knurled adjustment nut 173 having a spring retaining collar 174 is threadedly engaged with the shank 175 of the bolt. By turning the nut 173, the spring can be adjusted backwards or fowards from a given original position on the shank of the bolt 175. This permits the body to be trimmed so it has the proper angle into the oncoming air mass to maximize the aerodynamic efficiency. There is sufficient travel of the shock absorber to permit this adjustment. Instead of separate shock and spring, a combination single unit may be employed.

Figure 12:
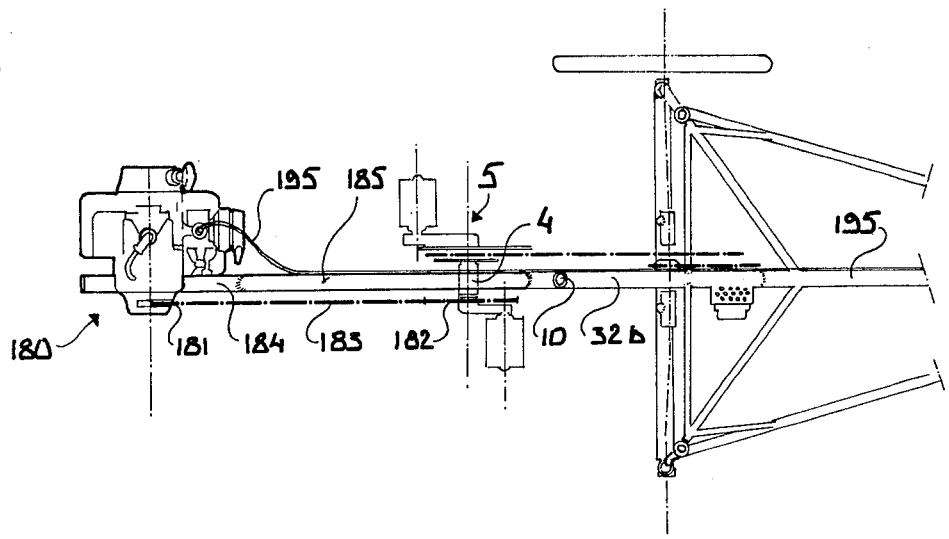
FIG. 12 is a plan view of an internal combustion engine used as a pedal assist.
Figure 13:
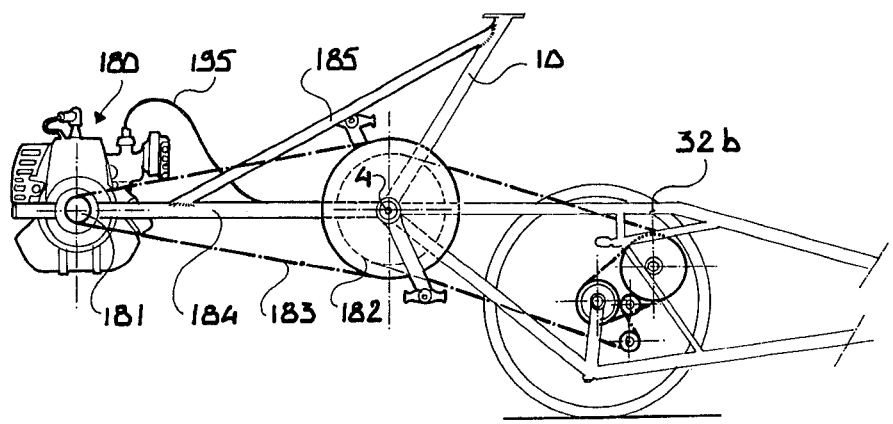
FIG. 13 is a side elevation of the pedal assist assembly shown in FIG. 12.

FIGS. 12 and 13 show in plan view and side elevation respectively a small displacement internal combustion engine 180 which is used to assist pedaling. The engine has an output gear 181 which powers a large chain ring 182 mounted on the crank spindle and connected thereto by chain 183. The chain ring 182 may be on the side opposite the pedal chain rings. The motor is mounted on a boom 184 secured to and extending forward of the bottom bracket 4 and which is braced to the upper body mount 10 by strut 185. Throttle control 195 extends back to the rider.

Figure 14:
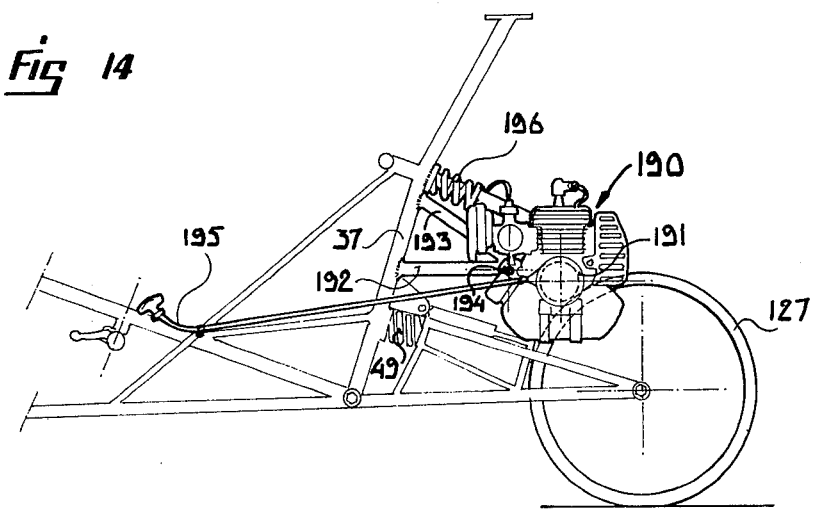
FIG. 14 is a side elevation of a rear motor system.

FIG. 14 shows a small displacement internal combustion engine 190 having an output wheel 191 in frictional contact with the rear wheel 127. This engine is pivotally mounted at 194 on a boom 192 extending rearwardly of the seat main 37 and is braced by stay 193. Throttle and contact control 195 extends forwardly to just beneath the seat where the rider can have easy access and control. The engine is also connected to spring tower 196 permitting pivotal movement when the wheel 127 bounces on its spring 49.

These engines may be very small displacement internal combustion engines, such as 50 cc, which are readily available. These engines will provide several hundred mile per gallon mileage. Further, instead of an internal combustion engine, battery powered motor may be used, and in turn the battery may be solar assisted or solar powered. There is an extensive area on the outer surface of the upper half shell fairing 221 on which to secure the solar cells for battery power. Where these cells are placed on the forward portion of the vehicle shell, they should be protected by a covering or a deflector should be placed just forward of them to deflect pebbles thrown up by vehicles.

Figure 15:
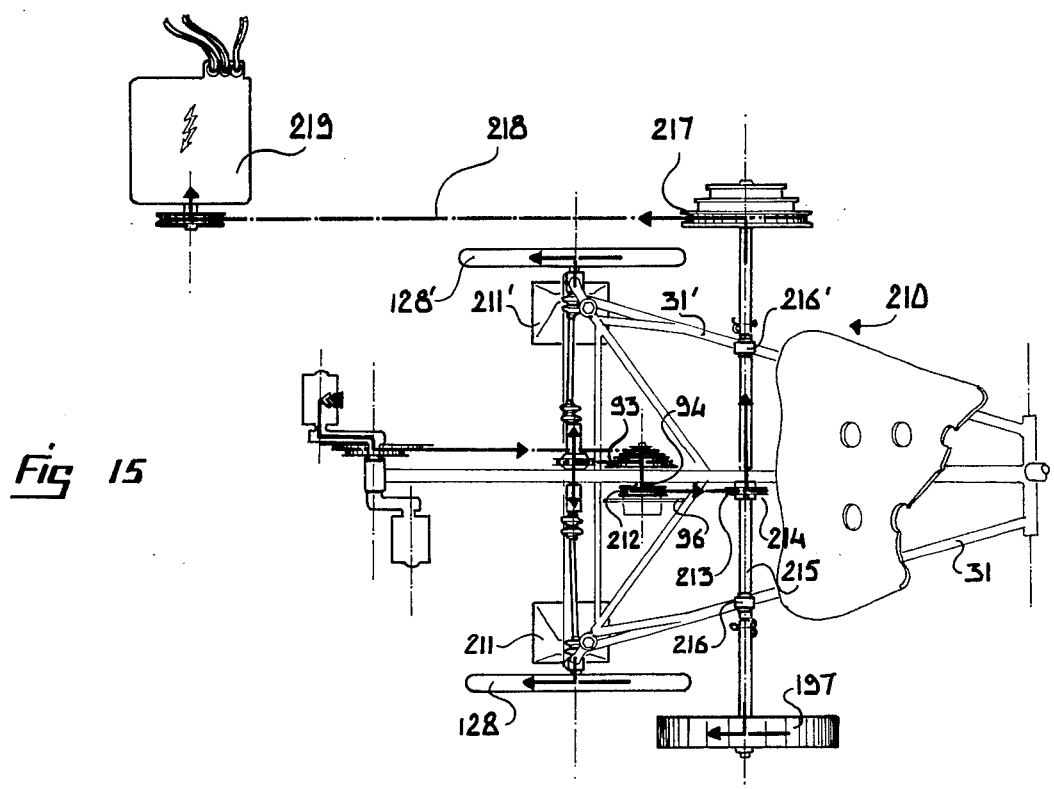
FIG. 15 is a plan view of a power take-off assembly particularly useful for Third World applications.

FIG. 15 illustrates a power take-off assembly 210 particularly useful for Third World applications. In operation, the bicycle is supported with its front wheels 128, 128' raised off the ground by means of stands 211 and 211'. An additional PTO transfer gear 212 is added to the hub 94 between the disc rotor 96 and the transfer gear 93. Power is transferred via chain 213 to PTO fixed gear 214 which drives PTO shaft 215 journaled in bearings 216, 216' which are secured to the lower mains 31, 31' respectively. Power then is transferred via pulley 217 by a belt or chain 218 to any type of device 219 sought to be powered. A single or multi-ganged pulley can be used at each end of the PTO shaft 215, or optionally a flywheel 197 may be added to the opposite end of the shaft. In addition, since the wheels of the tricycle are raised off the ground, these wheels 128, 128' also provide some flywheel effect. In addition to generating electrical power as shown, other types of devices may be run off the PTO. This includes log splitters, water pumps, saws, paddy threshers, refrigeration, fans, prime movers, lathes, wet or dry mills, pottery wheels, grain winnowers, elevators, and the like. Indeed, the power transfer assembly as illustrated in FIG. 4 with the PTO shown in FIG. 15 may be used independently as a stationary system for converting human power to light industrial usage.

FIGS. 16a and 16b illustrate some embodiments of a variety of modes for hauling objects. FIG. 16a shows in side elevation a rack 165 secured to seat main 37 and the rear transverse swing arm mount tube 42 by brace 166. A grocery basket 167 is illustrated as being carried thereon. In addition, a hard pannier or bags 168 may be suspended from the rack 165 and these may have a variety of pockets 169, 169' therein. A wide variety of racks, platforms, carrying baskets, panniers, and the like may be adapted to this vehicle, and may be placed behind and over the rear wheel, beneath or beside the driver in association with the shell fairing, or over and forward of the front wheels. Indeed, for Third World usage a platform may completely surround the driver as needed. Some of the platforms may have tiltable capacity for front or rear dumping.

FIGS. 17a and 17b show an alternative type of space triangulated frame, this one being a keel-type frame 260. The rear swing arm assembly 50 is substantially the same as that shown in the modified pyramidal type shown in FIGS. 1–3 and 6–9. The main frame assembly comprises a lower keel tube 261 which extends laterally down the centerline of the vehicle between the transverse swing arm mount tube 42 and the lower kingpin transverse connector tube 44. The kingpins, which are not shown, would be connected between the ends of the lower kingpin transverse connector 44 and the outboard ends of the upper kingpin connector tubes 262, 262'. Upper kingpin transverse struts 263, 263' brace the end position of the upper kingpin transverse connector tube and are welded to the seat tube 32a. The lower kingpin struts 264, 264' extend between the terminal ends of the kingpin transverse connector 44 toward the top tube. As shown in this example, the strut 264 intersects the upper kingpin strut 263 and is secured thereto be welding but may be placed at the intersection of the upper kingpin strut 263 with the seat tube 32a. The frame also includes the prow which comprises the bottom bracket tube 32b intersecting the down tube 43 at the bottom bracket 4. The front upper body mount 10 and rear upper body mount 20 are similar to those shown in FIGS. 1-3 and 6-9. Likewise, the drive support assembly is similar, having bearing tubes 73, 73' mounted on turret tubes 74, 74' and a drop-out plate supported by a triad of torsional control tubes. There is a single bottom bracket strut 265 which extends back to the upper kingpin strut 263. Vertical midrib brace 269 intersects struts 263, 263' at seat tube 32a. The handlebar (not shown) is journaled on the handlebar pivot tube 131 as seen in FIG. 17b. Rear seat main 37 terminates at its upper end in the rear upper body mount tube 20 which has attached thereto a telescoping upper seat mount tube 39 to which is attached the upper seat mount cross-piece 209. The seat tube 32a terminates at rear diagonal tube 266 which extends upwardly from the lower keel tube 261 to intersect rear seat main 37 at the telescoping tube 39. This rear diagonal tube is stabilized by seat stabilizer 267 which in turn transfers the force from the swing arm spring (not shown) via stabilizer tube 38. Rear diagonal struts 268, 268' extend from the seat stabilizer tube downwardly to the transverse swing arm mount tube ends to complete the bracing. This frame is somewhat lighter weight than the frame shown in FIGS. 1-3, but sacrifices some stability by virtue of flexing which occurs in the mid-section between the juncture of the rear diagonal struts with the seat tube and the kingpin struts with the same seat tube.

To observe cycle operation and rider condition, I prefer to use a monitor 18 having heart rate sensors on the handlebars and a magnetic pickup on one of the wheels. Commercially available monitors include the Pacer 2000 and the Entex bike computer. This permits monitoring mph, kph, odometer readings, time of day, peak speed, heart rate, cadence, timing (stopwatch), targeted time of arrival, ETA, alarm clock, distance remaining, speed required to reach destination at TTA, average speed, etc.

While the dimensions shown herein are for adults, the HPT of this invention can be easily scaled-down for children or smaller adults, and the frame constructed of light metal or plastic for a play vehicle.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. A human rider powered tricycle of a 2-1 configuration comprising in operative combination:
   (a) a triangulated space frame;
   (b) a front-end assembly which includes a pair of steerable front wheels;
   (c) means for driving said front wheels mounted on said frame which includes gears and a crank assembly engageable by said human rider;
   (d) a seat mounted on said frame rearwardly of said front wheels, said seat being adapted to provide a semirecumbent, supine riding position for said rider, said seat having a seat portion and a rigid back portion adapted to resist thrust from the hips of said rider;
   (e) a single trailing rear wheel mounted on said frame;
   (f) means for steering said front wheels; and
   (g) said steering means including handlebars pivotally mounted beneath said seat to said frame.

2. A tricycle as in claim 1 wherein:
   (a) said drive means includes a differential mounted in association with a front drive axle, and
   (b) said front axle is disposed in the tricycle front end.

3. A tricycle as in claim 2 which includes:
   means for braking said front wheels mounted in association with said drive means ahead of said differential.

4. A tricycle as in claim 3 wherein:
   (a) said drive means includes a drive transfer hub; and
   (b) said front wheel brake means includes a brake disc mounted on said transfer hub.

5. A tricycle as in claim 4 which includes:
   a rear wheel caliper brake assembly mounted in association with said rear wheel.

6. A tricycle as in claim 5 which includes:
   (a) means for actuating said front and rear wheel brake means;
   (b) means for actuating shifting of said gears; and
   (c) said brake and gear shift actuator means are mounted on said handlebars.

7. A tricycle as in claim 4 wherein said drive means includes:
   (a) a crank assembly having rider-operated pedals;
   (b) a main drive means mounted on said transfer hub;
   (c) first means for transferring power from said main gear to said main drive means; and
   (d) second means for transferring power from said transfer hub to said differential.

8. A tricycle as in claim 7 wherein:
   (a) said crank assembly includes at least one chain ring;
   (b) said main drive means includes a gear cluster;
   (c) said first drive transfer means is a chain; and
   (d) said second drive transfer means includes a transfer gear mounted on said transfer hub, and a chain.

9. A tricycle as in claim 8 wherein
   (a) said crank and chain ring assembly is mounted on a prow portion of said frame; and
   (b) said prow includes a bottom bracket in which said crank is journaled.

10. A tricycle as in claim 9 wherein:
    (a) said bottom bracket is mounted ahead of said drive axle; and
    (b) said crank includes a plurality of chain rings.

11. A tricycle as in claim 10 wherein:
    said chain rings and main drive gear cluster provide at least 21 forward speeds.

12. A tricycle as in claim 7 wherein:
    said frame includes an independent rear wheel suspension assembly of the swing arm type.

13. A tricycle as in claim 12 wherein:

(a) said swing arm suspension includes a spring tower assembly, and
(b) a shock absorber assembly.

14. A tricycle as in claim 13 wherein:
said spring tower assembly includes means for adjusting the position of said spring to adjust the trim of said frame.

15. A tricycle as in claim 12 in which:
(a) said main drive axle is split at said differential and includes intermediate axle members joined by universals; and wherein said front-end assembly includes;
(b) a pair of kingpin assemblies;
(c) said front wheels are mounted on stub axles journaled in said kingpin assemblies;
(d) a track rod linkage assembly pivotally joining said kingpin assemblies, and wherein said front wheel steering means includes:
(e) a drag link pivotally connected between at least one of said kingpins and said handlebars.

16. A tricycle as in claim 15 wherein:
said front end is set up with caster and camber inclination in the ranges of 1° to 2½°, and Ackerman compensation of 5°±3°.

17. A tricycle as in claim 16 wherein the vertical axes of inclination of said kingpins pass inside the rims of said wheels.

18. A tricycle as in claim 17 wherein said front end is set up with zero toe in/toe out.

19. A tricycle as in claim 15 wherein the track/wheelbase ratio is above 0.45.

20. A tricycle as in claim 19 wherein said track/wheelbase ratio is above 0.6.

21. A tricycle as in claim 19 wherein all three wheels are the same size.

22. A tricycle as in claim 21 wherein the wheels are 20" diameter wheels.

23. A tricycle as in claim 20 wherein the front wheels are 20" diameter wheels.

24. A tricycle as in claim 23 wherein said wheels include tires mounted on hook bead rims.

25. A tricycle as in claim 7 which includes:
a shoulder harness assembly secured to said frame to prevent said rider from sliding upward in said seat.

26. A tricycle as in claim 25 which includes:
a seat belt secured to said frame.

27. A tricycle as in claim 15 which includes:
a shoulder harness assembly secured to said frame to prevent said rider from sliding upward in said seat.

28. A tricycle as in claim 27 which includes:
a seat belt secured to said frame.

29. A tricycle as in claim 7 which includes:
means for adjusting the position of said seat on said frame.

30. A tricycle as in claim 29 wherein:
(a) said crank is mounted on a prow portion of said frame; and
(b) the length of said prow is adjustable for various sized riders.

31. A tricycle as in claim 15 which includes:
means for adjusting the position of said seat on said frame.

32. A tricycle as in claim 31 wherein the length of said prow is adjustable for various sized riders.

33. A tricycle as in claim 9 which includes:
a motor for assisting said rider to power said tricycle.

34. A tricycle as in claim 33 wherein said motor assist includes:
(a) means for assisting pedaling connected to said crank assembly; and
(b) said motor being one of an internal combustion engine and an electric motor.

35. A tricycle as in claim 33 wherein said motor assist includes:
(a) means for transferring motor power to said rear wheel; and
(b) said motor being one of an internal combustion engine and an electric motor.

36. A tricycle as in claim 34 wherein said motor is electric, and includes a battery and a solar battery charging unit.

37. A tricycle as in claim 35 wherein said motor is electric, and includes a battery and a solar battery charging unit.

38. A tricycle as in claim 1 which includes:
at least partial fairing.

39. A tricycle as in claim 38 wherein:
said fairing covers at least a portion of said frame.

40. A tricycle as in claim 38 wherein:
(a) said fairing is a full-body shell enclosing said frame, said shell having openings for said wheels; and
(b) said frame includes means for mounting said body shell thereon.

41. A tricycle as in claim 40 wherein:
said body shell includes an openable cockpit hatch for entry and exit by said rider, and said hatch includes a clear windshield.

42. A tricycle as in claim 41 wherein:
said windshield is open at the top to permit at least a portion of said rider's head to project through said opening.

43. A tricycle as in claim 42 wherein:
said body shell includes a plurality of air inlets.

44. A tricycle as in claim 38 wherein:
said wheels are faired.

45. A tricycle as in claim 43 wherein:
said wheels are faired.

46. A tricycle as in claim 43 wherein said body shell has a streamlined configuration.

47. A tricycle as in claim 38 which includes:
a safety lighting system which includes at least one front and one rear light.

48. A tricycle as in claim 47 wherein:
said lighting system includes directional signals.

49. A tricycle as in claim 47 wherein:
said lighting system includes at least one strobe-type warning light.

50. A tricycle as in claim 48 which includes:
(a) a plurality of rear lights;
(b) means for controlling the sequencing of said lights; and
(c) means disposed of said handlebars for rider initiation of illumination of said lights.

51. A tricycle as in claim 1 which includes:
a safety lighting system which includes at least one front and one rear light.

52. A tricycle as in claim 51 wherein:
said lighting system includes directional signals.

53. A tricycle as in claim 51 wherein:
said lighting system includes at least one strobe-type warning light.

54. A tricycle as in claim 52 which includes:
(a) a plurality of rear lights;
(b) means for controlling the sequencing of said lights; and (c) means disposed on said handlebars for rider initiation of illumination of said lights.

55. A tricycle as in claim 1 which includes:
at least one other seat mounted to said frame.

56. A tricycle as in claim 55 wherein:
(a) said other seat is for a second human rider, which seat is disposed in a relationship selected from side-by-side and fore-aft with respect to said first seat; and
(b) said drive means includes a second crank assembly operable by said second rider.

57. A tricycle as in claim 55 wherein:
said other seat is disposed to receive a plurality of passengers.

58. A tricycle as in claim 10 wherein:
(a) the axis of said bottom bracket lies within 2 in. above or below a horizontal longitudinal line passing through the axis of the rider's hip joints.

59. A tricycle as in claim 58 wherein:
(a) the included angle of inclination $\theta$ between said seat back and said horizontal longitudinal line is $130° \pm 20°$.

60. A tricycle as in claim 1 which includes:
a power take-off assembly selectively engageable by said drive means.

61. A tricycle as in claim 60 wherein:
said PTO is mounted on said frame, and includes a rotatable shaft and means for providing rotational power to said shaft.

62. A tricycle as in claim 61 wherein:
(a) said drive means includes a drive transfer hub; and
(b) said rotational power means includes a means for transferring power from said hub to said rotatable shaft mounted in association with said hub.

63. A tricycle as in claim 62 wherein:
(a) said transfer means on said hub includes a transfer gear and a chain; and
(b) said rotational power means includes a gear mounted in association with said PTO shaft.

64. A tricycle as in claim 62 wherein:
said PTO includes output power means comprising at least gears, pulleys and combinations thereof.

65. A tricycle as in claim 64 wherein:
said PTO includes a flywheel mounted in association with said PTO shaft.

66. A tricycle as in claim 64 which includes:
means for maintaining said front wheels out of contact with a surface so they are free to rotate, thereby acting as flywheel mass.

67. A tricycle as in claim 1 which includes:
means for carrying loads comprising at least a rack, pannier, bag, platform, basket, container, seat, compartment, dumpable body, and combinations thereof.

68. A tricycle as in claim 1 which includes:
means for monitoring from time to time the operation of the rider and/or the vehicle.

69. A tricycle as in claim 1 wherein:
said frame includes a steel alloy, a plastic, wood, bamboo, and/or titanium.

70. A tricycle as in claim 69 wherein:
said frame is an alloy of 10-20-5 DOM mandrel drawn steel.

71. A tricycle as in claim 46 wherein said shell streamlined configuration comprises:
(a) in plan view, a generally lozenge shape with a gently rounded nose portion extending ahead of said crank assembly, the widest portion of the lozenge shape being adjacent the front wheels so that the lozenge shape is assymetric front to back, the back portion being longer than the front portion, and having a tail portion terminating just behind the rear wheel, and said cockpit hatch is disposed with its longitudinal centerpoint approximately half the distance between the tail portion termination and the widest portion adjacent the front wheels;
(b) in side elevation view, a generally bomb-shaped front portion extending from said cockpit hatch forward, the front portion tapering backwardly to a raised tail section behind said cockpit hatch, the tail portion terminating vertically below the top of a rider's head and sloping downwardly in the tail portion to terminate just behind said rear wheel;
(c) in front elevation, a generally circular nose portion flaring to shoulder portions above the front wheels, and a raised, rounded central hump between the shoulder portions rising to said cockpit hatch;
(d) in rear elevation, a generally vertical rectangular tail tapering smoothly to a generally pear-shaped midsection adjacent the longitudinal center portion of said cockpit hatch; and
(e) said plurality of air inlets disposed in the upper surface of said body shell between said nose portion and the shoulder portions, said cockpit hatch having at least one opening permitting a draw of air from said air inlets through said shell to cool the rider while said tricycle is in motion.

* * * * *